United States Patent
Taguchi et al.

(10) Patent No.: US 11,414,231 B2
(45) Date of Patent: Aug. 16, 2022

(54) INSPECTION DEVICE AND PTP PACKAGING MACHINE

(71) Applicant: CKD CORPORATION, Aichi (JP)

(72) Inventors: Yukihiro Taguchi, Aichi (JP); Tsuyoshi Ohyama, Aichi (JP); Norihiko Sakaida, Aichi (JP)

(73) Assignee: CKD CORPORATION, Aichi (JP)

( * ) Notice: Subject to any disclaimer, the term of this patent is extended or adjusted under 35 U.S.C. 154(b) by 21 days.

(21) Appl. No.: 17/088,752

(22) Filed: Nov. 4, 2020

(65) Prior Publication Data

US 2021/0047066 A1 Feb. 18, 2021

Related U.S. Application Data

(63) Continuation of application No. PCT/JP2019/003590, filed on Feb. 1, 2019.

(30) Foreign Application Priority Data

May 30, 2018 (JP) .............................. JP2018-103672

(51) Int. Cl.
*B65B 57/10* (2006.01)
*B65B 9/04* (2006.01)
(Continued)

(52) U.S. Cl.
CPC .............. *B65B 57/10* (2013.01); *B65B 9/045* (2013.01); *B65B 61/065* (2013.01);
(Continued)

(58) Field of Classification Search
CPC ....... B65B 57/10; B65B 9/045; B65B 61/065; B65B 61/26; G01N 21/3563;
(Continued)

(56) References Cited

U.S. PATENT DOCUMENTS

2014/0145082 A1* 5/2014 Fukuma ............. G01N 21/3563
250/339.07
2014/0340670 A1* 11/2014 Tsuchikawa ........... G01N 33/46
356/51

FOREIGN PATENT DOCUMENTS

JP       S54-143193 A     11/1979
JP       2010112887 A  *   5/2010
(Continued)

OTHER PUBLICATIONS

English machine translation of JP2010112887 (Year: 2010).*
(Continued)

*Primary Examiner* — Dominic J Bologna
(74) *Attorney, Agent, or Firm* — Osha Bergman Watanabe & Burton LLP

(57) ABSTRACT

An inspection device is used in manufacture of a PTP sheet that comprises a container film including a pocket portion in which a content is placed and a cover film closing the pocket portion. The inspection device includes: an illumination device that emits near infrared light; a light shield that is placed between the illumination device and the container film and prevents the near infrared light from entering the container film; a through hole in the light shield that allows the near infrared light to pass through; a spectroscope that disperses reflected light from the content; an imaging device that images an optical spectrum of the reflected light and obtains spectroscopic image data; and a controller that: obtains spectral data of the content based on the spectroscopic image data; and performs a predetermined inspection with regard to the content based on the spectral data of the content.

9 Claims, 15 Drawing Sheets

(51) Int. Cl.

| | | |
|---|---|---|
| *G01N 21/359* | (2014.01) | |
| *G01N 21/90* | (2006.01) | |
| *G01N 21/95* | (2006.01) | |
| *B65B 61/06* | (2006.01) | |
| *G01N 21/3563* | (2014.01) | |
| *G01N 21/84* | (2006.01) | |
| *B65B 61/26* | (2006.01) | |

(52) U.S. Cl.
CPC ....... *G01N 21/359* (2013.01); *G01N 21/3563* (2013.01); *G01N 21/90* (2013.01); *G01N 21/9508* (2013.01); *B65B 61/26* (2013.01); *G01N 2021/845* (2013.01)

(58) Field of Classification Search
CPC .. G01N 21/359; G01N 21/90; G01N 21/9508; G01N 2021/845
See application file for complete search history.

(56) References Cited

FOREIGN PATENT DOCUMENTS

| | | |
|---|---|---|
| JP | 2010-172672 A | 8/2010 |
| JP | 2013-122401 A | 6/2013 |
| JP | 6329668 B1 | 5/2018 |
| WO | 2013/002291 A1 | 1/2013 |
| WO | 2015/136620 A1 | 9/2015 |

OTHER PUBLICATIONS

Notice of Reasons for Refusal issued in corresponding Japanese Patent Application No. 2018-103672 dated Jul. 9, 2019 (9 pages).
International Search Report issued in corresponding International Application No. PCT/JP2019/003590 dated Apr. 16, 2019 (5 pages).
Written Opinion of the International Searching Authority issued in corresponding International Application No. PCT/JP2019/003590 dated Apr. 16, 2019 (4 pages).
International Preliminary Report on Patentability issued in corresponding International Application No. PCT/JP2019/003590 dated Dec. 10, 2020 (13 pages).

* cited by examiner

INSPECTION DEVICE AND PTP PACKAGING MACHINE

BACKGROUND

Technical Field

The present invention relates to an inspection device configured to perform an inspection for inclusion of any different type of object and the like by taking advantage of spectral analysis and a PTP packaging machine equipped with the inspection device.

Description of Related Art

A PTP (press through pack) sheet is known as a blister pack sheet generally used in the field of pharmaceutical products and the like.

A PTP sheet is comprised of a container film that has pocket portions filled with contents, such as tablets, and a cover film that is mounted to the container film such as to seal openings of the pocket portions. In general, the container film is made of a transparent resin material or the like, and the cover film is made of an opaque material such as aluminum foil.

In manufacture of the PTP sheet, an inspection for inclusion of any different type of the content or the like is performed by taking advantage of spectral analysis. This inspection irradiates the content with near infrared light, disperses reflected light from the content by a spectroscope, and performs an analysis process (for example, principal component analysis), based on spectral data obtained by taking an image of the dispersed reflected light, so as to detect inclusion of any different type of the content (as described in, for example, Patent Literature 1 and Patent Literature 2).

Patent Literature 1 discloses a method of irradiating a tablet with near infrared light from an opening side of a pocket portion, taking an image of reflected light from the tablet and performing spectral analysis in a stage after the tablet is filled into the pocket portion but before a cover film is mounted to the container film.

Patent Literature 2 discloses a method of irradiating a tablet with near infrared light across a container film (a pocket portion), taking an image of reflected light from the tablet and performing spectral analysis in a stage after the tablet is filled into the pocket portion and a cover film is mounted to the container film.

PATENT LITERATURE

Patent Literature 1: WO 2015/136620A
Patent Literature 2: JP 2010-172672A

However, phenomena described below likely occur in the configuration that performs spectral analysis of the tablet that is placed in the pocket portion of the container film like Patent Literature 1 and Patent Literature 2 or more specifically in a configuration that performs spectral analysis with irradiating a tablet 83 with near infrared light directly from an opening side of a pocket portion 82 not across a container film 81 as shown in FIG. 19A or in a configuration that performs spectral analysis with irradiating the tablet 83 with near infrared light across the container film 81 (the pocket portion 82) as shown in FIG. 19B.

Irradiation light L0 which the tablet 83 placed in the pocket portion 82 of the container film 81 is irradiated with includes, for example, ambient light L2 which enters the container film 81 (the pocket portion 82 or a flange portion 84), which propagates in the container film 81 as if the light passed through a light guide plate, and which the tablet 83 is irradiated with, in addition to primary irradiation light L1 that is emitted straight from a light source to the tablet 83 directly or across the pocket portion 82.

The primary irradiation light L1 which is emitted straight from the light source to the tablet 83 and the ambient light L2 which goes through inside of the container film 81 and which the tablet 83 is then irradiated with have different light intensities and different wavelength characteristics.

For example, the primary irradiation light L1 is stable with little variation in light intensity among the respective pocket portions 82 and has a wavelength characteristic of relatively uniform spectral intensities of respective wavelength components [as shown in FIG. 20A].

The ambient light L2, on the other hand, has a significant variation in light intensity among the respective pocket portions 82 and a distorted wavelength characteristic due to, for example, differences in the shape and the thickness of the container film 81 (the pocket portion 82 and the flange portion 84) [as shown in FIG. 20B]. The irradiation light L configured by combining the primary irradiation light L1 with the ambient light L2 accordingly has a variation in light quantity among the pocket portions 82 and a distorted wavelength characteristic [as shown in FIG. 20C].

When the tablets 83 in the respective pocket portions 82 are irradiated with the varying irradiation light L0 as described above, the results of spectral analysis (spectral data) obtained by imaging the respective tablets 83 vary even for the identical tablets 83.

As a result, this makes it difficult to perform the quality judgment of the tablets 83 and is likely to decrease the inspection accuracy in the state that the tablets 83 are placed in the pocket portions 82 of the container film 81.

Even in a configuration of moving a tablet by the force of gravity to a position where the tablet is in contact with part of a pocket portion and irradiating the tablet with near infrared light across the pocket portion from a contact surface side where the tablet is in contact with part of the pocket portion as described in Patent Literature 2, the contact surface side of the tablet with the pocket portion is irradiated with the light that propagates in the pocket portion (the container film) as if the light passed through a light guide plate like the ambient light L2 described above. This is likely to cause the same phenomena as described above.

SUMMARY

One or more embodiments of the present invention provide an inspection device configured to suppress reduction in inspection accuracy with regard to an inspection taking advantage of spectral analysis, as well as a PTP packaging machine.

Functions and advantageous effects that are characteristic of one or more embodiments are also described as appropriate.

There is provided an inspection device used in a process of manufacturing a PTP sheet configured such that a predetermined content (for example, a tablet) is placed in a pocket portion formed in a container film and that a cover film is mounted to the container film so as to close the pocket portion. The inspection device comprises an irradiation unit (i.e., illumination device) configured to emit near infrared light toward the container film with the content placed in; a light shield member (i.e., light shield) placed between the irradiation unit and the container film and configured to block the near infrared light from entering the container film; a through hole provided in the light shield member and configured to allow the near infrared light to pass through; a spectral unit (i.e., spectroscope) configured to disperse reflected light that is reflected from the content irradiated with the near infrared light across the through hole of the light shield member; an imaging unit (i.e., imaging device) configured to take an image of an optical spectrum of the reflected light dispersed by the spectral unit; a spectral data obtaining module (i.e., controller) configured to obtain spectral data of the content, based on spectroscopic image data obtained by the imaging unit; and an inspection module (i.e., controller) configured to perform a predetermined inspection (for example, different type inclusion inspection) with regard to the content, based on the spectral data of the content obtained by the spectral data obtaining module.

The inspection device of one or more embodiments that performs the different type inclusion inspection or the like by taking advantage of spectral analysis, is equipped with the light shield member configured to block the near infrared light emitted from the irradiation unit from entering the container film and is configured to obtain the spectral data with regard to the content via the through hole formed in the light shield member.

This configuration suppresses or prevents the near infrared light from unnecessarily entering the container film and also reduces the ambient light which is transmitted through the container film and which the content is irradiated with, thus enabling the more accurate spectral data to be obtained with regard to the content.

As a result, this configuration allows for stable spectral analysis with regard to the content even in the state that the content is placed in the pocket portion of the container film, and thereby suppresses reduction of the inspection accuracy.

Patent Literature 2 described above does not mention a light shield member. If the plate-like member 4d (shown in FIG. 18 of this literature) is made of a light shield material, phenomena described below are likely to arise.

In the inspection device of Patent Literature 2, the plurality of apertures 4c are pierced in the plate-like member 4d according to the shape of the pockets 4. While the PTP sheet 18 is mounted such that the pockets 4 are placed in the apertures 4c of the plate-like member 4d, the inspection device performs an inspection with irradiating the solid preparations 5 with near infrared light NIR across the pockets 4.

Accordingly, the reflected light that is reflected by the inner circumferential face of the holes 4c provided in the plate-like member 4d is likely to enter the side faces of the pockets 4, work as ambient light and significantly affect the inspection.

The inspection device of one or more embodiments is, on the other hand, configured such that the "light shield member" is placed between the "irradiation unit" and the "container film". More specifically, when the near infrared light is radiated from the opening side of the pocket portion of the container film, the "light shield member" is placed between the "irradiation unit" and a "general portion (flange portion) of the container film". When the near infrared light is radiated from the protrusion side of the pocket portion of the container film, on the other hand, the "light shield member" is placed between the "irradiation unit" and the "bottom (top) of the pocket portion of the container film". This configuration suppresses the reflected light that is reflected by an inner circumferential face of the through hole of the light shield member from entering a side face of the pocket portion and reduces a potential effect on the inspection.

The "general portion (flange portion) of the container film" denotes a substantially flat part of the container film where no pocket portion is formed and where the cover film is mounted (non-pocket portion forming area)" (the same applies hereinafter).

Among the conventional inspection devices configured to take two-dimensional luminance images of the contents and performs various inspections, there is an inspection device equipped with a reflected light shield member (light shield member) to block the reflected light that is reflected from a part of the container film other than the contents (pocket portions) in an imaging range, for example, the general portion (flange portion) of the container film, from entering the imaging unit and thereby reduce the effect of the reflected light.

In the inspection device that takes advantage of spectral analysis, however, the reflected light that is reflected from the part of the container film other than the contents in the imaging range has only negligible influence. Providing the reflected light shield member as described above has only an extremely small effect on the result of the inspection with regard to the content.

In the inspection device that takes advantage of spectral analysis, the incident light entering the container film causes a more significant matter than this reflected light. For example, in the state that near infrared light is allowed to enter an area of the container film out of the imaging range, this incident light is likely to propagate to the content and cause the phenomena described above.

Accordingly, the light shield member of one or more embodiments may be configured to shield the light at least in an entire irradiation area (excluding the through hole) on the container film that is possibly irradiated with the near infrared light in the case of providing no light shield member.

Especially in the case of an inspection of the content that is placed in a container film in a belt-like shape (including a PTP film after a cover film is mounted), there is a wider continuous range of the container film, compared with in the case of an inspection of the content placed in each punched-out PTP sheet. There is accordingly a possibility that not only the incident light entering the periphery of a content as an object to be inspected but even the incident light entering a location farther from the content propagates to the content.

Accordingly, the light shield member may be provided that covers not only the vicinity of the imaging range but a relatively wide range of the container film.

In the inspection device that takes advantage of spectral analysis, on the other hand, the imaging unit has a narrow imaging range. There is accordingly no need to form a significantly large through hole in the light shield member. Thus, the through hole may be formed such that the area of a general portion of the light shield member (a part where no through hole is formed, i.e., a light shield part) is larger than at least the opening area of the through hole.

In a configuration that the content is irradiated obliquely with near infrared light via the through hole like the configuration of one or more embodiments, using near infrared light that is parallel light is likely to cause a shaded part and thereby decrease the inspection accuracy. In the configuration of one or more embodiments, near infrared light that is diffused light may be accordingly used. In the case of using near infrared light that is diffused light, however, there is a wider irradiation area of the near infrared light. Accordingly, the light shield member that covers a relatively wide range of the container film may be provided.

In the inspection device of one or more embodiments, the through hole may be configured to have a dimension in a wavelength dispersion direction of the optical spectrum and/or a direction perpendicular to the wavelength dispersion direction smaller than a dimension of the pocket portion in the wavelength dispersion direction and/or the direction perpendicular to the wavelength dispersion direction.

The configuration of one or more embodiments suppresses the near infrared light from unnecessarily entering the general portion (flange portion) of the container film. As a result, this configuration further enhances the functions and the advantageous effects of the configuration described above.

In the inspection device of one or more embodiments, the spectral data obtaining module may obtain the spectral data of the content by using at least spectroscopic image data obtained by the imaging unit in such a state that a center of the pocket portion or a center of the content in the wavelength dispersion direction of the optical spectrum and/or the direction perpendicular to the wavelength dispersion direction is located at a center position of the through hole in the wavelength dispersion direction and/or the direction perpendicular to the wavelength dispersion direction.

The configuration of one or more embodiments enables spectral data of the content to be obtained in such a state that extremely little near infrared light enters the container film (the pocket portion) via the through hole, i.e., in such a state that there is significantly little influence of ambient light. As a result, this configuration further enhances the functions and the advantageous effects of the configuration described above.

In the inspection device of one or more embodiments, the through hole may be configured to have a dimension in a wavelength dispersion direction of the optical spectrum and/or a direction perpendicular to the wavelength dispersion direction smaller than a dimension of the content in the wavelength dispersion direction and/or the direction perpendicular to the wavelength dispersion direction.

The configuration of one or more embodiments suppresses the near infrared light from unnecessarily entering not only the general portion (flange portion) of the container film but the pocket portion. As a result, this configuration further enhances the functions and the advantageous effects of the configuration described above.

In the inspection device of one or more embodiments, the spectral data obtaining module may obtain the spectral data of the content by using at least spectroscopic image data obtained by the imaging unit in such a state that the content blocks the through hole in plan view that is viewed in a direction perpendicular to a general portion of the container film.

The configuration of one or more embodiments enables spectral data of the content to be obtained in such a state that no near infrared light enters the container film (the pocket portion) via the through hole, i.e., in such a state that there is no influence of ambient light. As a result, this configuration further enhances the functions and the advantageous effects of the configuration described above.

The inspection device of one or more embodiments may further comprise a background portion located on a side opposite to the irradiation unit across the container film and configured to look black or dark in color to a ray in a wavelength range of the near infrared light.

The configuration of one or more embodiments prevents the light reflected by the background portion from becoming ambient light. As a result, this configuration further enhances the functions and the advantageous effects of the configuration described above.

The "background portion" corresponds to, for example, a conveyance lane provided to convey the container film prior to mounting of a cover film and corresponds to a cover film itself after mounting of the cover film.

The state that the "background portion" "looks black or dark in color to the ray in the wavelength range of near infrared light" includes, for example, such a state that the "background portion" is colored with a coloring agent (a pigment or a dye) of black or a dark color that does not reflect or is unlikely to reflect the near infrared light, for example, carbon black or another black pigment or such a state that the "background portion" is made of such a colored material.

More specifically, the cover film may be configured to have its surface covered with a coat layer of black or a dark color that does not reflect or is unlikely to reflect the near infrared light.

In the inspection device of one or more embodiments, the light shield member may have a surface on a side opposed to the imaging unit, which is configured to look a lighter color than the black or the dark color of the background portion to a ray of at least one specific wavelength component included in the wavelength range of the near infrared light.

In the inspection device that performs spectral analysis, the imaging range of the imaging unit is a linear narrow range. It is accordingly difficult to adjust the imaging range to an appropriate location with high accuracy.

Under the configuration of one or more embodiments, for example, when the light shield member is irradiated with near infrared light and spectroscopic image data is obtained by the imaging unit prior to a start of manufacturing the PTP sheet (for example, in a state that the container film is not set in the PTP packaging machine or in a state that the container film is set in the PTP packaging machine but a filling operation of the content into the pocket portion has not yet been started), luminance data of respective pixels belonging to a pixel array with regard to a specific wavelength component in the spectroscopic image data has a high luminance level corresponding to the position of a general portion of the light shield member (a part where no through hole is formed, i.e., a light shield part) and has a low luminance level corresponding to the position of the through hole (background portion).

The configuration of one or more embodiments can thus check the levels (light-dark levels) of the luminance data of the respective pixels belonging to the pixel array with regard to the specific wavelength component in the spectroscopic image data and thereby recognize the position of the through hole of the light shield member relative to the imaging unit (imaging range).

In other words, this configuration enables the positional relationship of the imaging unit (imaging range) relative to the light shield member (the through hole) to be recognized, based on the spectroscopic image data. Accordingly, this configuration allows for position adjustment of the imaging unit and the light shield member.

The inspection device of one or more embodiments may further comprise a display unit (i.e., display device) configured to display luminance data of respective pixels belonging to a pixel array with regard to the specific wavelength component in the spectroscopic image data, in a predetermined mode that causes at least a relationship between a position of each of the pixels (a position in a direction perpendicular to a wavelength dispersion direction of an optical spectrum) and a luminance level at the position to be recognized.

The configuration of one or more embodiments enables an operator to perform position adjustment of the imaging unit and the light shield member with viewing the luminance data (light-dark level data) displayed on the display unit. This configuration accordingly enables the position adjustment of both the imaging unit and the light shield member to be performed more readily and more accurately.

In the inspection device of one or more embodiments, the light shield member may have at least a surface on a side opposed to the container film, which is configured to look black or dark in color to a ray in a wavelength range of the near infrared light.

The configuration of one or more embodiments prevents the light reflected by the light shield member from becoming ambient light. As a result, this configuration further enhances the functions and the advantageous effects of the configuration described above.

The state that "at least the surface of the light shield member on the side opposed to the container film looks black or dark in color to the ray in the wavelength range of near infrared light" includes, for example, such a state that "at least the surface of the light shield member on the side opposed to the container film" is colored with a coloring agent (a pigment or a dye) of black or a dark color that does not reflect or is unlikely to reflect the near infrared light, for example, carbon black or another black pigment or such a state that "at least the surface of the light shield member on the side opposed to the container film" is made of such a colored material.

There is provided a PTP packaging machine comprising the inspection device described above.

The PTP packaging machine equipped with the inspection device described above has advantages, for example, exclusion of any defective product including any different type of object with high accuracy in the manufacturing process of the PTP sheet.

In general, the PTP packaging machine may be configured to comprise a pocket portion forming unit configured to form a pocket portion in a container film in a belt-like shape; a filling unit configured to fill a content into the pocket portion; a mounting unit configured to mount a cover film in a belt-like shape to the container film with the pocket portion filled with the content, so as to close the pocket portion; and a separation unit configured to separate a PTP sheet from a PTP film in a belt-like shape obtained by mounting the cover film to the container film (including a punching unit configured to punch out each PTP sheet from the PTP film).

In the PTP packaging machine of one or more embodiments, the inspection device may be arranged in "a post process after the pocket portion is filled with the content by the filling unit and a previous process before the cover film is mounted by the mounting unit". This configuration enables an inspection of the content to be performed without any shielding substance and thereby enhances the inspection accuracy of the individual contents.

Under the configuration that performs an inspection of the content placed in the pocket portion with radiation of near infrared light from the opening side of the pocket portion of the container film, the light shield member described above effectively works not only when the container film is made of a translucent material such as a transparent resin material but when the container film is made of a light shield material (for example, a metal material such as aluminum foil or an opaque resin material). When the container film is made of the light shield material such as aluminum foil, the light reflected by an inner surface of the pocket portion is likely to become ambient light and affect the inspection.

Furthermore, in the PTP packaging machine of one or more embodiments, the inspection device may be arranged in "a post process after the cover film is mounted by the mounting unit and a previous process before the PTP sheet is separated by the separation unit". This configuration enables an inspection to be performed in such a state that the contents are not exchanged, and thereby further enhances the inspection accuracy. A modification of this configuration may take an image of the content and perform an inspection from a side where the content is not in contact with the pocket portion.

In the PTP packaging machine of one or more embodiments, the inspection device may be arranged in "a post process after the PTP sheet is separated by the separation unit". This configuration enables a check for inclusion of any defective product to be performed in a final stage.

BRIEF DESCRIPTION OF DRAWINGS

FIG. 16A is a schematic diagram illustrating such a state that an imaging position of the imaging device does not overlap through holes of the light shield plate, and FIG. 16B is a chart showing one line expression of luminance data of respective pixels belonging to a pixel array with regard to a specific wavelength component out of spectroscopic image data obtained in the state of FIG. 16A, on a display screen of a display device;

FIG. 17A is a schematic diagram illustrating such a state that the imaging position of the imaging device overlaps the through holes of the light shield plate, and FIG. 17B is a chart showing one line expression of luminance data of the respective pixels belonging to the pixel array with regard to the specific wavelength component out of spectroscopic image data obtained in the state of FIG. 17A, on the display screen of the display device.

FIG. 20A is a chart illustrating a wavelength characteristic of primary irradiation light, which the tablet placed in the pocket portion is irradiated with;

DETAILED DESCRIPTION OF EMBODIMENTS

The following describes embodiments with reference to drawings. The configuration of a PTP sheet is described first in detail.

Figure 1A:
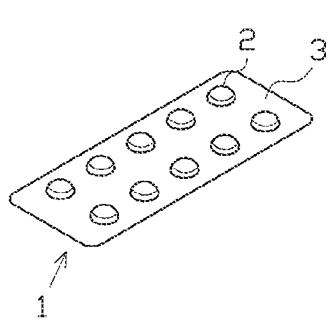
FIG. 1A is a perspective view illustrating a PTP sheet.
Figure 1B:
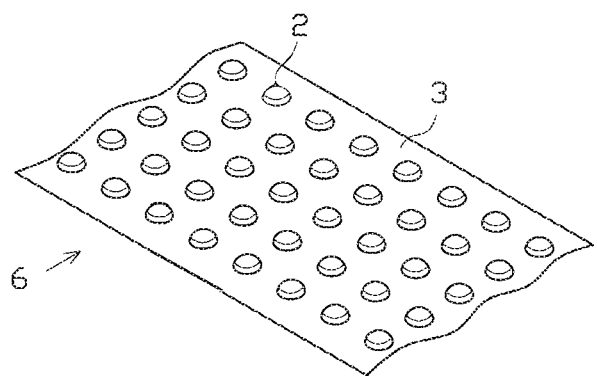
FIG. 1B is a perspective view illustrating a PTP film.
Figure 2:
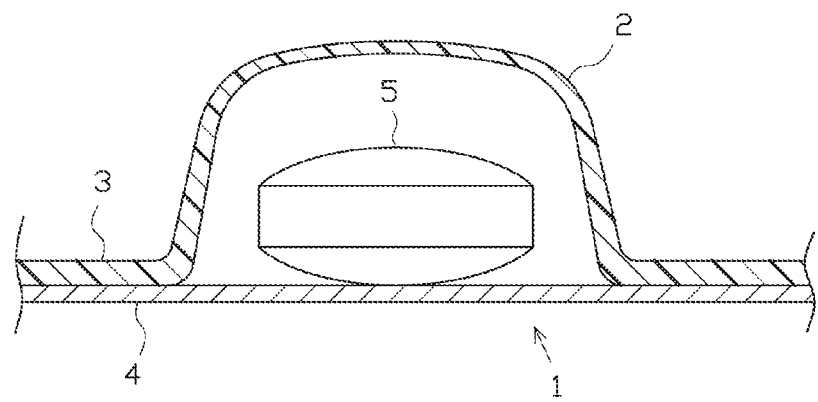
FIG. 2 is a partly enlarged sectional view illustrating a pocket portion of the PTP sheet.

As shown in FIG. 1 and FIG. 2, a PTP sheet 1 includes a container film 3 having a plurality of pocket portions 2, and a cover film 4 mounted to the container film 3 such as to close the respective pocket portions 2.

The container film 3 according to one or more embodiments is made from a transparent or translucent thermoplastic resin material, such as PP (polypropylene) or PVC (polyvinyl chloride), and has translucency. The cover film 4 is, on the other hand, made from an opaque material (for example, aluminum foil) with a sealant made of, for example, a polypropylene resin, provided on the surface thereof.

The PTP sheet 1 is formed in an approximately rectangular shape in plan view. The PTP sheet 1 is configured such that two pocket arrays are formed along a sheet short side direction and that each pocket array includes five pocket portions 2 arranged along a sheet longitudinal direction. Accordingly, the PTP sheet 1 has a total of ten pocket portions 2. One tablet 5 is placed as a content in each of the pocket portions 2.

The PTP sheet 1 (shown in FIG. 1A) is manufactured by punching sheets from a belt-like PTP film 6 (shown in FIG. 1B) that is comprised of the belt-like container film 3 and the belt-like cover film 4.

The following describes the general configuration of a PTP packaging machine 10 used to manufacture the PTP sheet 1 described above, with reference to FIG. 3.

Figure 3:
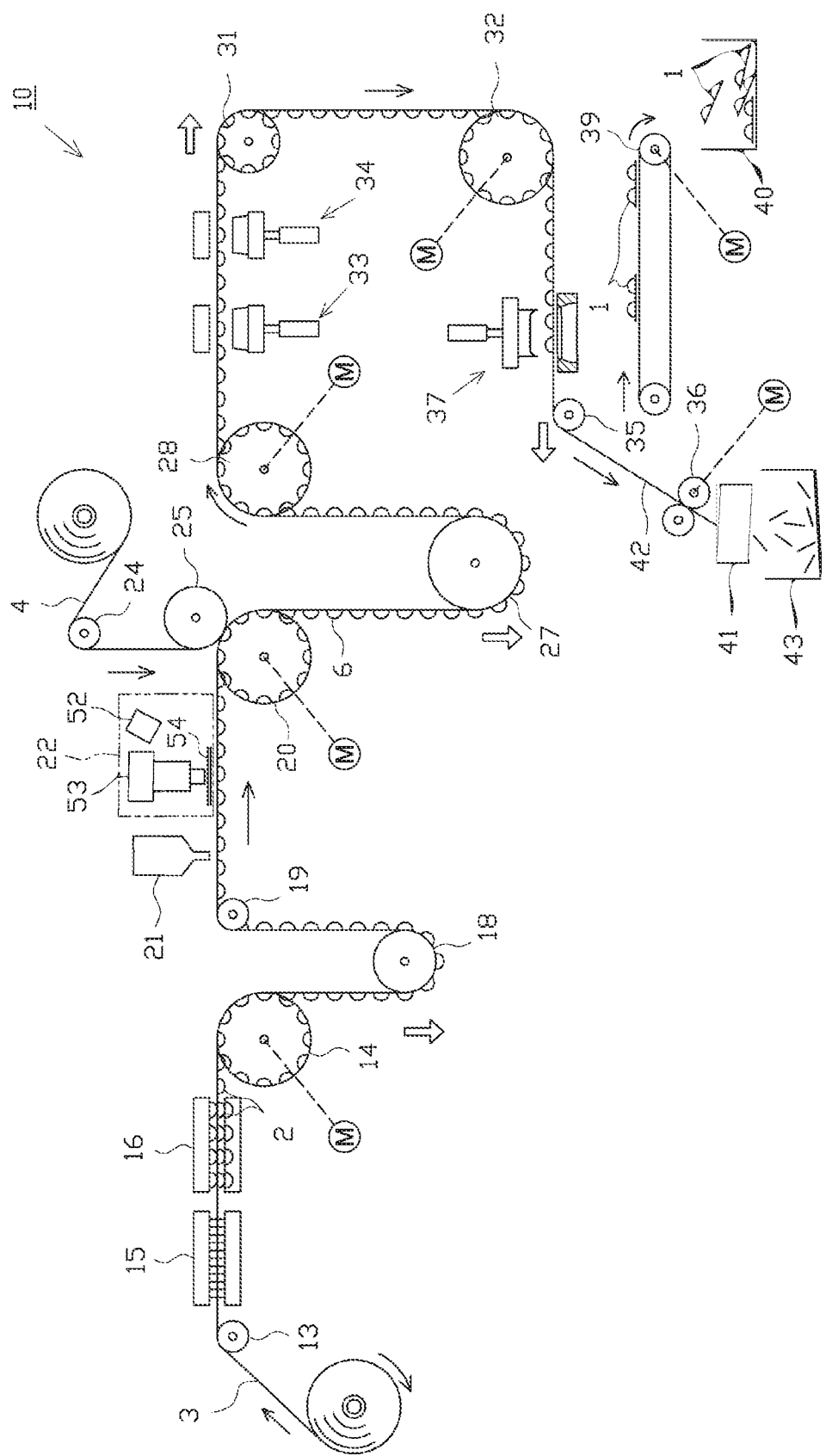
FIG. 3 is a schematic diagram illustrating the schematic configuration of a PTP packaging machine.

As shown in FIG. 3, a film roll of the belt-like container film 3 is wound in a roll form on a most upstream side of the PTP packaging machine 10. A pullout end of the container film 3 wound in the roll form is guided by a guide roll 13. The container film 3 is then laid on an intermittent feed roll 14 provided on a downstream side of the guide roll 13. The intermittent feed roll 14 is linked with a motor rotating in an intermittent manner, so as to convey the container film 3 intermittently.

A heating device 15 and a pocket portion forming device 16 are sequentially placed along the conveyance path of the container film 3 between the guide roll 13 and the intermittent feed roll 14. In the state that the container film 3 is heated to be relatively soft by the heating device 15, the plurality of pocket portions 2 are formed at predetermined positions of the container film 3 by the pocket portion forming device 16 (pocket portion forming process). The heating device 15 and the pocket portion forming device 16 are configured as the pocket portion forming unit according to one or more embodiments. Formation of the pocket portions 2 is performed during an interval between conveying operations of the container film 3 by the intermittent feed roll 14.

The container film 3 fed from the intermittent feed roll 14 is sequentially laid on a tension roll 18, a guide roll 19 and a film receiving roll 20 in this order. The film receiving roll 20 is linked with a motor rotating at a fixed speed, so as to continuously convey the container film 3 at a fixed speed. The tension roll 18 is configured to pull the container film 3 in a direction of applying tension by an elastic force. This configuration prevents a slack of the container film 3 due to a difference between the conveying operation by the intermittent feed roll 14 and the conveying operation by the film receiving roll 20 and constantly keeps the container film 3 in the state of tension.

A tablet filling device 21 and an inspection device 22 are sequentially placed along the conveyance path of the container film 3 between the guide roll 19 and the film receiving roll 20.

The tablet filling device 21 serves as the filling unit to automatically fill the tablets 5 into the pocket portions 2. The tablet filling device 21 opens a shutter at every predetermined time interval to drop the tablet 5, in synchronism with the conveying operation of the container film 3 by the film receiving roll 20. Each of the pocket portions 2 is filled with the tablet 5 by this shutter opening operation (filling process).

The inspection device 22 is a spectroscopic analyzer configured to perform an inspection by taking advantage of spectral analysis and more specifically to check for inclusion of any different type of object. The details of the inspection device 22 will be described later.

A film roll of the belt-like cover film 4 is also wound in a roll form on a most upstream side. A pullout end of the cover film 4 wound in the roll form is guided by a guide roll 24 to a heating roll 25. The heating roll 25 is pressed against to be in contact with the film receiving roll 20 described above. The container film 3 and the cover film 4 are accordingly fed into between the two rolls 20 and 25.

The container film 3 and the cover film 4 pass through between the two rolls 20 and 25 in the heated and pressed contact state, so that the cover film 4 is mounted to the container film 3 such as to close the respective pocket portions 2 (mounting process). This series of operations provides the belt-like PTP film 6 manufactured such that the tablet 5 is filled in each of the pocket portions 2. The heating roll 25 has minute protrusions formed on the surface of the heating roll 25 in a net-like pattern for sealing. Strongly pressing these protrusions against the films provides secure sealing. The film receiving roll 20 and the heating roll 25 are configured as the mounting unit according to one or more embodiments.

The PTP film 6 fed from the film receiving roll 20 is sequentially laid on a tension roll 27 and an intermittent feed roll 28 in this order. The intermittent feed roll 28 is linked with a motor rotating in an intermittent manner, so as to convey the PTP film 6 intermittently. The tension roll 27 is configured to pull the PTP film 6 in a direction of applying tension by an elastic force. This configuration prevents a slack of the PTP film 6 due to a difference between the conveying operation by the film receiving roll 20 and the conveying operation by the intermittent feed roll 28 and constantly keeps the PTP film 6 in the state of tension.

The PTP film 6 fed from the intermittent feed roll 28 is sequentially laid on a tension roll 31 and an intermittent feed roll 32 in this order. The intermittent feed roll 32 is linked with a motor rotating in an intermittent manner, so as to convey the PTP film 6 intermittently. The tension roll 31 is configured to pull the PTP film 6 in a direction of applying tension by an elastic force and thereby serves to prevent a slack of the PTP film 6 between these intermittent feed rolls 28 and 32.

A slit formation device 33 and a stamping device 34 are sequentially placed along the conveyance path of the PTP film 6 between the intermittent feed roll 28 and the tension roll 31. The slit formation device 33 serves to form a cutting slit at predetermined positions of the PTP film 6. The stamping device 34 serves to stamp a mark at predetermined positions of the PTP film 6 (for example, in tag portions).

The PTP film 6 fed from the intermittent feed roll 32 is sequentially laid on a tension roll 35 and a continuous feed roll 36 in this order on a downstream side of the intermittent feed roll 32. A sheet punching device 37 is placed along the conveyance path of the PTP film 6 between the intermittent feed roll 32 and the tension roll 35. The sheet punching device 37 serves as a sheet punching unit (separation unit) to punch out the outer periphery of each PTP sheet 1 from the PTP film 6.

The respective PTP sheets 1 punched out by the sheet punching device 37 are conveyed by a conveyor 39 and are temporarily accumulated in a finished product hopper 40 (separation process). When a PTP sheet 1 is determined as a defective product by the inspection device 22 described above, however, this PTP sheet 1 determined as defective is not conveyed to the finished product hopper 40 but is separately discharged by a non-illustrated defective sheet discharge mechanism serving as the discharge unit.

A cutting device 41 is provided on a downstream side of the continuous feed roll 36. An unrequired film portion 42 that is a residual part (scrap part) remaining in a belt-like form after punching out by the sheet punching device 37 is guided by the tension roll 35 and the continuous feed roll 36 and is subsequently led to the cutting device 41. A driven roll is pressed against to be in contact with the continuous feed roll 36, so that the unrequired film portion 42 is placed and conveyed between the driven roll and the continuous feed roll 36. The cutting device 41 serves to cut the unrequired film portion 42 into predetermined dimensions as scraps. These scraps are accumulated in a scrap hopper 43 and are disposed separately.

Each of the rolls, for example, the rolls 14, 20, 28, 31 and 32 described above is arranged such that the roll surface is opposed to the pocket portions 2. The surface of each roll, for example, the surface of the intermittent feed roll 14, has recesses that are formed to place the pocket portions 2 therein. This configuration suppresses the pocket portions 2 from being crushed. The feeding operation with the pocket portions 2 placed in the recesses of each roll, for example, the intermittent feed roll 14, achieves the reliable intermittent feed and continuous feed.

An accumulation device, a transfer device, a packaging device and the like are sequentially placed on a downstream side of the PTP packaging machine 10, although not being illustrated. The loose PTP sheets 1 placed in the finished product hopper 40 described above are, for example, paired to form sets of two and are then stacked in each group of multiple sets by the accumulation device. A stacked assembly of a plurality of the PTP sheets 1 is bundled with a band by the transfer device, is transferred to the packaging device, and is packaged, for example, in the form of a pillow case, by the packaging device.

Figure 4:
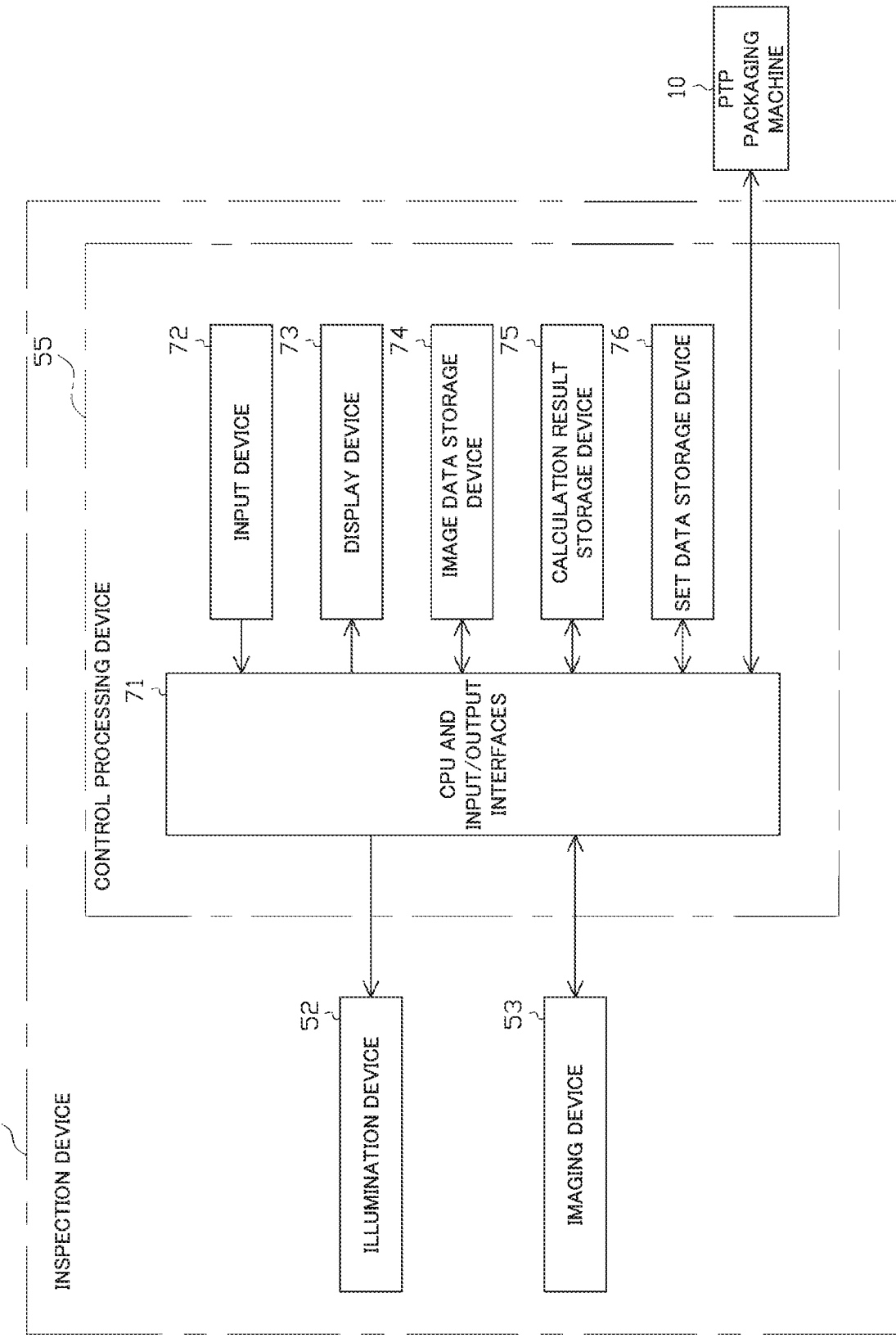
FIG. 4 is a block diagram illustrating the electrical configuration of an inspection device.
Figure 5:
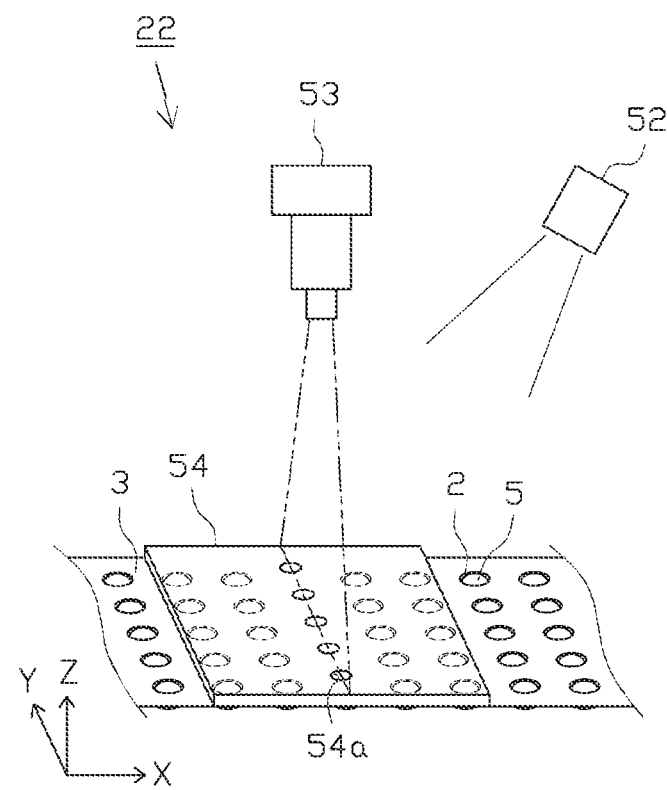
FIG. 5 is a perspective view schematically illustrating the arrangement configuration of the inspection device.

The foregoing describes the outline of the PTP packaging machine 10. The following describes the configuration of the above inspection device 22 in detail with reference to drawings. FIG. 4 is a block diagram illustrating the electrical configuration of the inspection device 22. FIG. 5 is a perspective view schematically illustrating the arrangement configuration of the inspection device 22.

As shown in FIG. 4 and FIG. 5, the inspection device 22 includes an illumination device 52, an imaging device 53, a light shield plate 54, and a control processing device (i.e., controller) 55 configured to perform various controls in the inspection device 22, for example, drive controls of the illumination device 52 and the imaging device 53, image processing, arithmetic operations and the like.

The illumination device 52 and the imaging device 53 are placed on an opening side of the pocket portions 2 of the container film 3. More specifically, according to one or more embodiments, an inspection for inclusion of any different type of object is performed from the opening side of the pocket portions 2 of the container film 3 in a stage prior to mounting of the cover film 4.

The illumination device 52 has a known configuration to radiate near infrared light and is configured as the irradiation unit according to one or more embodiments. The illumination device 52 is arranged to irradiate a predetermined area (an irradiation area K described below) on the continuously fed container film 3 obliquely downward with near infrared light.

According to one or more embodiments, a halogen lamp is employed for the illumination device 52 as a light source configured to emit near infrared light having a continuous spectrum (for example, a near infrared range having a wavelength of 700 to 2500 nm). Other examples usable as the light source include a deuterium lamp, a tungsten lamp, and a xenon lamp.

Figure 6:
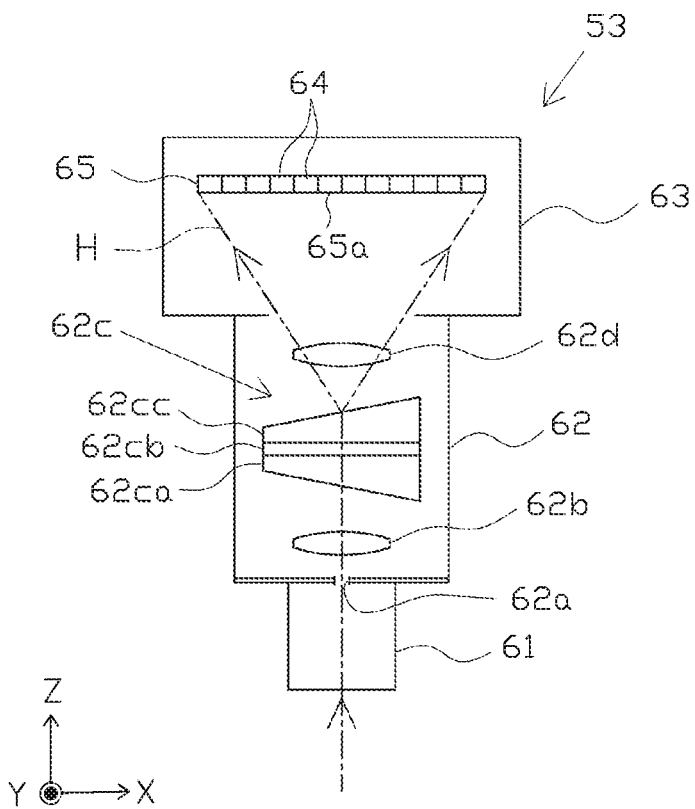
FIG. 6 is a schematic diagram illustrating the schematic configuration of an imaging device.

As shown in FIG. 6, the imaging device 53 includes an optical lens assembly 61, a two-dimensional spectroscope 62 serving as the spectral unit, and a camera 63 serving as the imaging unit.

The optical lens assembly 61 is comprised of a plurality of non-illustrated lenses and the like and is configured to convert incident light into parallel light. The optical lens assembly 61 has an optical axis that is set along a vertical direction (Z direction).

The optical lens assembly 61 is set to focus the incident light at the position of a slit 62a of the two-dimensional spectroscope 62 described later. As a matter of convenience, the following describes an example of employing a double-sided telecentric lens for the optical lens assembly 61. An image-sided telecentric lens may, however, also be employable for the optical lens assembly 61.

The two-dimensional spectroscope 62 is configured to include a slit 62a, an incident-side lens 62b, a spectral portion 62c and an emission-side lens 62d. The spectral portion 62c is configured to include an incident-side prism 62ca, a transmission type diffraction grating 62cb, and an emission-side prism 62cc.

Under the configuration described above, the light passing through the slit 62a is converted into parallel light by the incident-side lens 62b, is dispersed by the spectral portion 62c, and is focused by the emission-side lens 62d on an imaging element 65 of the camera 63 described later as a two-dimensional spectroscopic image (optical spectral image).

The slit 62a is formed to have a long approximately rectangular (linear) opening and is provided such that an opening width direction (short side direction) thereof is arranged along a film conveying direction of the container film 3 (X direction) and that a longitudinal direction thereof is arranged along a film width direction of the container film 3 (Y direction) orthogonal to the conveying direction. This configuration causes the two-dimensional spectroscope 62 to disperse the incident light in the opening width direction of the slit 62a, i.e., in the film conveying direction (X direction). Accordingly, the film conveying direction (X direction) denotes the wavelength dispersion direction according to one or more embodiments.

The camera 63 includes an imaging element 65 having a light receiving surface 65a where a plurality of light-receiving elements (light receivers) 64 are two-dimensionally arranged in a matrix arrangement. According to one or more embodiments, a known CCD area sensor having sufficient sensitivity to, for example, a wavelength range of 1300 to 2000 nm, out of the near infrared range, is employed as the imaging element 65.

A generally known configuration of the CCD area sensor includes a plurality of light-receiving elements that are two-dimensionally arranged in a matrix arrangement and that are formed from photoelectric transducers (for example, photo diodes) configured to convert the incident light into electric charges corresponding to its quantity of light and to accumulate the converted electric charges therein; a plurality of vertical transfer portions that are configured to successively transfer the electric charges accumulated in the respective light-receiving elements in a vertical direction; a horizontal transfer portion that are configured to successively transfer the electric charges transferred from the vertical transfer portions in a horizontal direction; and an output amplifier that is configured to convert the electric charges transferred from the horizontal transfer portion into a voltage, to amplify the voltage and to output the amplified voltage.

The imaging element is, however, not necessarily limited to this example, but another sensor having sensitivity to the near infrared range is also employable as the imaging element. For example, a CMOS sensor or an MCT (HgCdTe) sensor may be employed as the imaging element.

The imaging device 53 has a field of vision (imaging area) that is a linear region extended along the film width direction (Y direction) and that is a region including at least the entire film width direction of the container film 3 (as shown by a two-dot chain line portion in FIG. 5). The field of vision of the imaging device 53 in the film conveying direction (X direction) is, on the other hand, a region corresponding to the width of the slit 62a. In other words, the field of vision is a region that causes an image of the light passing through the slit 62a (slit light) to be formed on the light receiving surface 65a of the imaging element 65.

This configuration causes each wavelength component (for example, every bandwidth of 10 to 20 nm) of the optical spectrum of the reflected light that is reflected at each position in the film width direction (Y direction) of the container film 3 to be received by each of the light-receiving elements 64 of the imaging element 65. A signal corresponding to the intensity of the light received by each of the light-receiving elements 64 is converted into a digital signal and is then output from the camera 63 to the control processing device 55. Accordingly, an image signal (spectroscopic image data) corresponding to one image plane that is imaged by the entire light receiving surface 65a of the imaging element 65 is output to the control processing device 55.

The light shield plate 54 is configured as a light shield member or a light shield according to one or more embodiments. The light shield plate 54 is formed in an approximately flat plate-like shape from a light shield material having the light shielding property, such as a metal material or a resin material.

Figure 7:
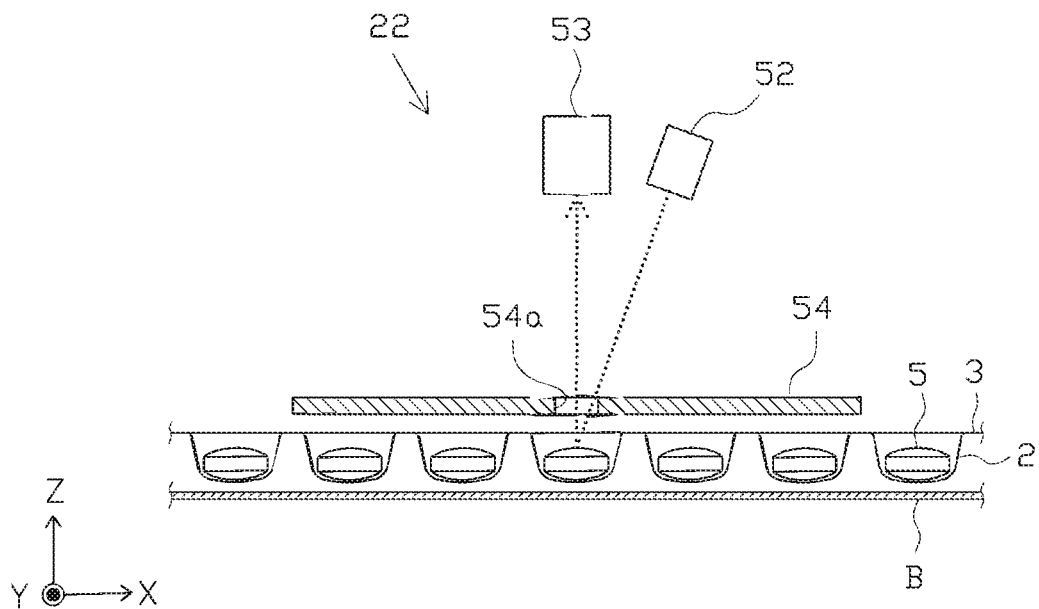
FIG. 7 is a partial sectional view schematically illustrating the arrangement configuration of the inspection device.
Figure 8:
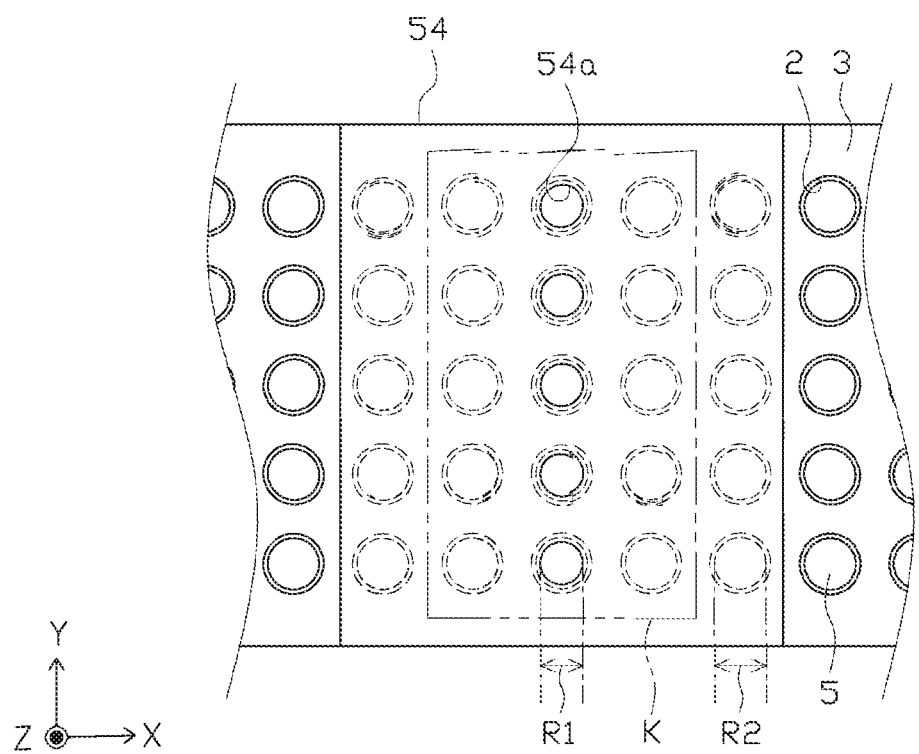
FIG. 8 is a plan view illustrating the configuration of a light shield plate.

As shown in FIG. 7 and FIG. 8, the light shield plate 54 is formed in a rectangular shape in plan view and is placed near to the container film 3 such as to cover an upper surface of the container film 3.

The light shield plate 54 has such dimensions as to cover the entire irradiation area K (excluding through holes 54a described later) of near infrared light emitted from the illumination device 52. More specifically, the light shield plate 54 according to one or more embodiments is formed to have an identical width with the width of the container film 3, such as to cover the entire film width direction (Y direction) of the container film 3. The light shield plate 54 also has such a length in the film conveying direction (X direction) that covers an area where five pocket portions 2 are formed.

Five through holes 54a are formed along the film width direction in a center portion of the light shield plate 54 in the film conveying direction. The five through holes 54a are formed corresponding to five pocket portions 2 arrayed at predetermined intervals in the film width direction of the container film 3.

The through holes 54a are pierced in the vertical direction to allow the near infrared light emitted from the illumination device 52 to pass therethrough. The through holes 54a according to one or more embodiments are formed in a circular shape in plan view and have a diameter R1 that is set to be smaller than a diameter R2 of the tablets 5.

The control processing device 55 includes a CPU and input/output interfaces 71 (hereinafter referred to as "CPU and the like 71") that is configured to control the entire inspection device 22, an input device 72 that is configured as the "input unit" by, for example, a keyboard and a mouse or by a touch panel, a display device 73 that is configured as the "display unit" including a display screen such as a CRT screen or a liquid crystal screen, an image data storage device 74 that is configured to store various image data and the like, a calculation result storage device 75 that is configured to store results of various arithmetic operations and the like, and a set data storage device 76 that is configured to store various pieces of information in advance. These devices 72 to 76 are electrically connected with the CPU and the like 71.

The CPU and the like 71 is connected with the PTP packaging machine 10 such as to send and receive various signals to and from the PTP packaging machine 10. This configuration enables the CPU and the like 71 to control, for example, the defective sheet discharge mechanism of the PTP packaging machine 10.

The image data storage device 74 is configured to store, for example, spectroscopic image data obtained by the imaging device 53, spectral image data obtained on the basis of the spectroscopic image data, and binarized image data after a binarization process.

The calculation result storage device 75 is configured to store, for example, inspection result data and statistical data obtained by statistically processing the inspection result data. These inspection result data and statistical data may be displayed appropriately on the display device 73.

The set data storage device 76 is configured to store, for example, loading vectors and a determination range used for principal component analysis, and the shapes and the dimensions of the PTP sheet 1, the pocket portion 2 and the tablet 5.

The following describes a procedure of different type inclusion inspection (inspection process) performed by the inspection device 22.

Figure 9:
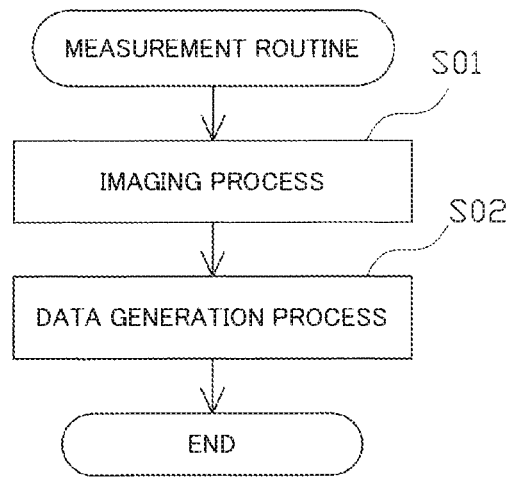
FIG. 9 is a flowchart showing a measurement routine.

A measurement routine performed to obtain spectral data is described first with reference to the flowchart of FIG. 9. This routine is a process performed repeatedly every time a predetermined amount of the container film 3 is conveyed.

At step S01, the control processing device 55 first causes the imaging device 53 to perform an imaging process (exposure process), while irradiating the continuously conveyed container film 3 (tablet 5) with near infrared light emitted from the illumination device 52 (irradiation process).

The control processing device 55 drives and controls the imaging device 53 in response to a signal input from a non-illustrated encoder provided in the PTP packaging machine 10, and stores spectroscopic image data taken by the imaging device 53 into the image data storage device 74.

Accordingly, reflected light that is reflected in a conveying direction imaging range W (shown in FIG. 12), out of the near infrared light emitted from the illumination device 52 toward the irradiation area K on the container film 3 (the light shield plate 54), during an execution period of the imaging process of step S01 (exposure period) enters the imaging device 53. In other words, an image of the conveying direction imaging range W is taken by one imaging process.

Figure 12:
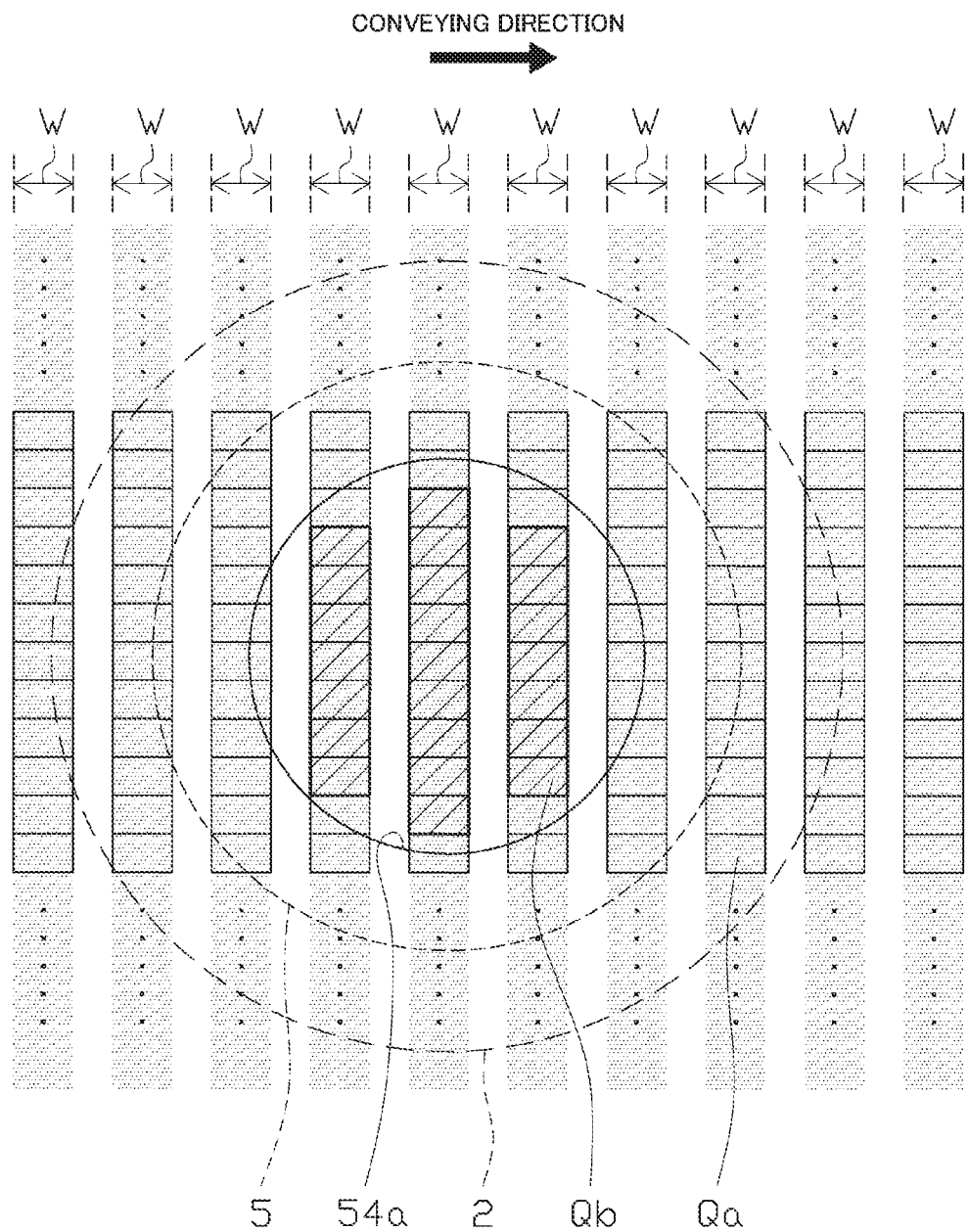
FIG. 12 is an explanatory diagram illustrating a relationship between a conveying direction imaging range and a spectral image.

As shown in FIG. 12, one or more embodiments are configured such that the imaging process described above is performed every time the container film 3 is conveyed by a predetermined amount. This configuration takes an image of the optical spectrum at a plurality of positions with regard to one tablet 5.

Furthermore, this configuration sets at least one imaging process to be performed at a timing when the center of the pocket portion 2 is located at a center position of the through hole 54a.

Even when the tablet 5 is shifted in position inside of the pocket portion 2 and the center of the tablet 5 is not located at the center of the pocket portion 2, this configuration of one or more embodiments enables an image of the optical spectrum of the tablet 5 to be taken at least once in the state that the through hole 54a is blocked by the tablet 5 in plan view according to the relationship between the sizes of the tablet 5 and the pocket portion 2.

Accordingly, the configuration of one or more embodiments enables an image of the optical spectrum of the tablet 5 to be taken with no near infrared light entering the container film 3 (the pocket portion 2) via the through hole 54a, i.e., with no influence of ambient light.

The reflected light entering the imaging device 53 is dispersed by the two-dimensional spectroscope 62 (dispersion process) and is taken in the form of a spectroscopic image (optical spectrum) by the imaging element 65 of the camera 63 (imaging process). During the execution period of the imaging process (exposure period), the container film 3 (the tablet 5) is continuously conveyed, so that this process takes an image of an averaged optical spectrum in the conveying direction imaging range W (as shown in FIG. 10).

Figure 10:
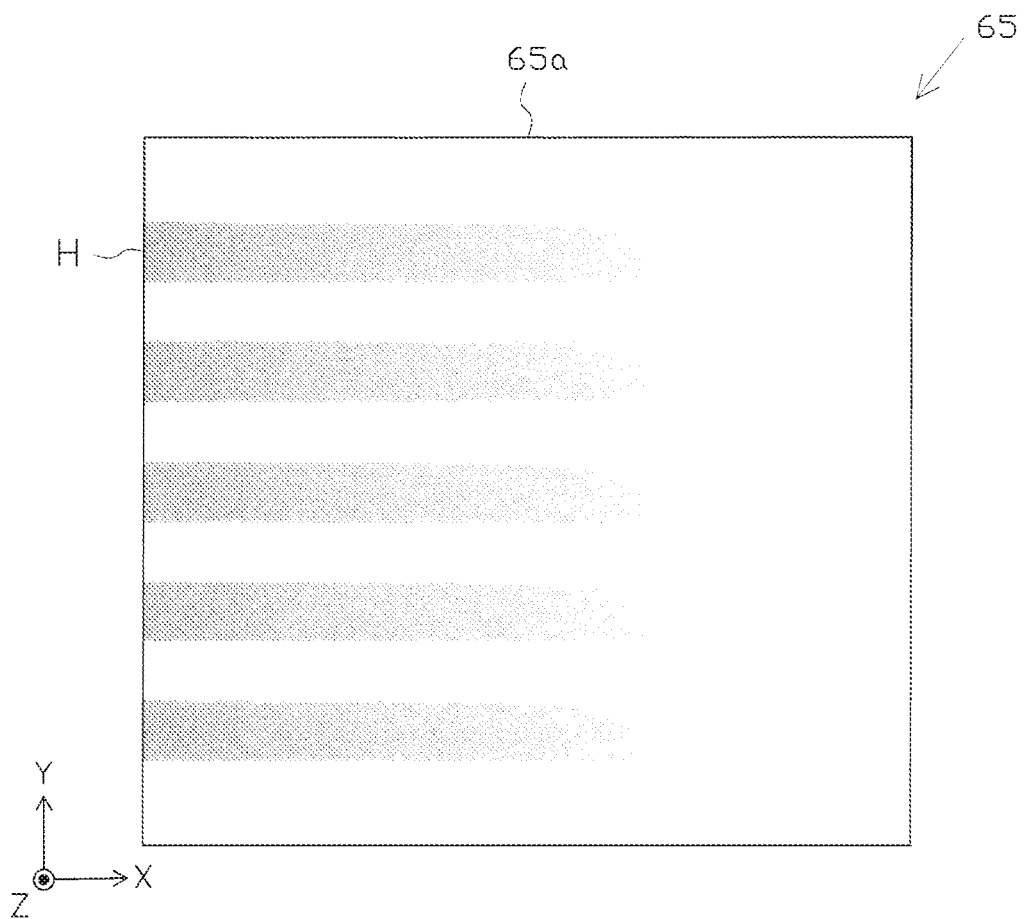
FIG. 10 is a schematic diagram illustrating an optical spectrum projected onto an imaging element.

FIG. 10 is a schematic diagram illustrating the state that an optical spectrum H of reflected light that is reflected at a predetermined position on the tablet 5 is projected onto the light receiving surface 65a of the imaging element 65. As a matter of convenience, FIG. 10 illustrates only the optical spectrum H with regard to the tablet 5, while omitting optical spectra with regard to the other locations (for example, the light shield plate 54).

The spectroscopic image (optical spectrum) data taken by the imaging device 53 is output to the control processing device 55 during an interval period and is stored into the image data storage device 74. The interval period herein denotes a reading period of image data. Accordingly, an imaging cycle of the imaging device 53 is expressed by a total time of the exposure period that is the execution period of the imaging process and the interval period.

After obtaining the spectroscopic image data, the control processing device 55 starts a data generation process soat step S02.

The data generation process generates spectral data, based on the spectroscopic image data obtained at step S01. After generating the spectral data, the control processing device 55 stores the generated spectral data into the image data storage device 74 and then terminates this routine. This process corresponds to the spectral data obtaining process according to one or more embodiments. The processing function of the control processing device 55 that performs this process configures the spectral data obtaining module according to one or more embodiments.

Figure 13:
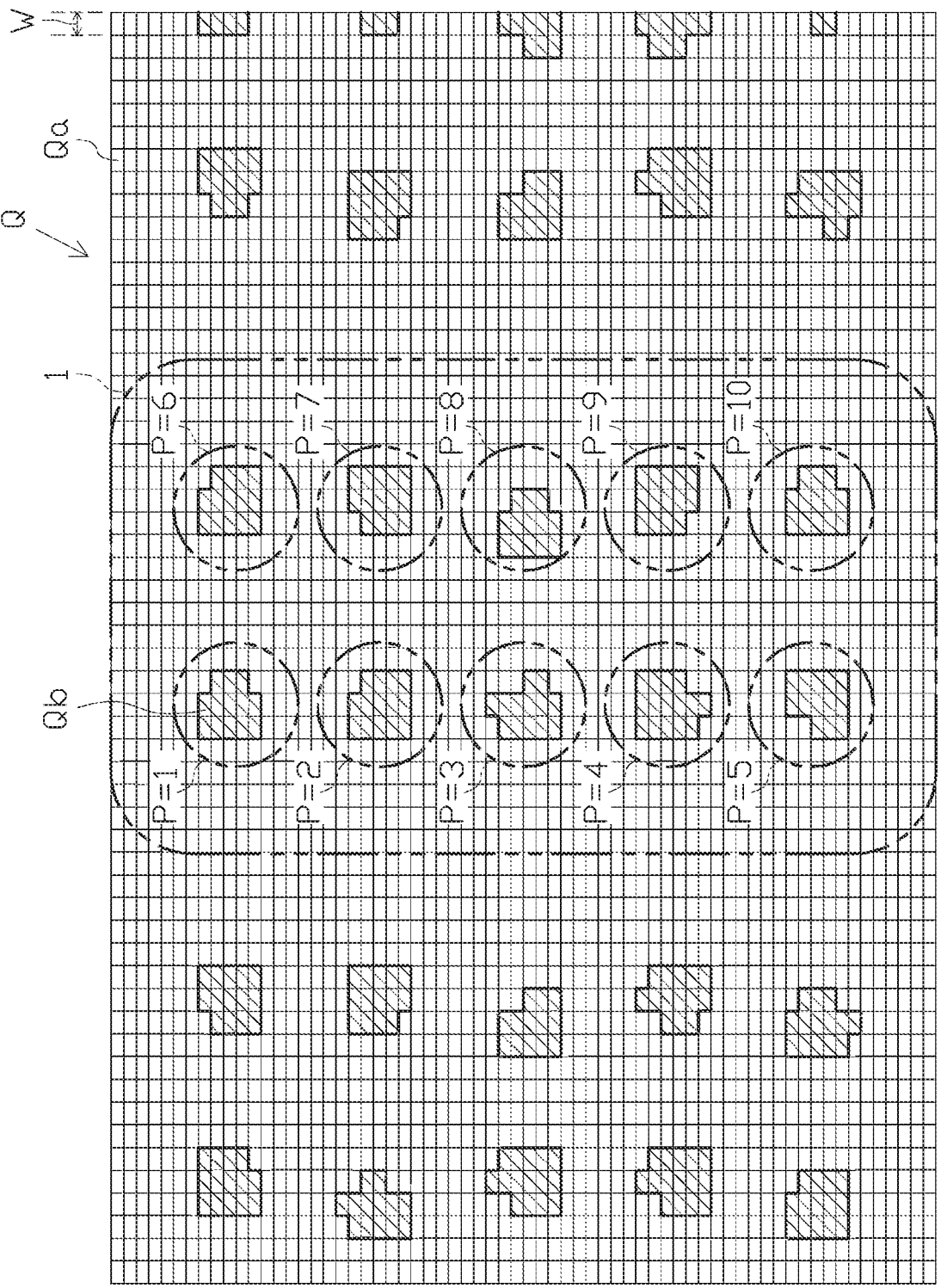
FIG. 13 is a schematic diagram illustrating a spectral image.

As shown in FIG. 12, every time the container film 3 (tablet 5) is conveyed by a predetermined amount, the conveying direction imaging range W is relatively moved intermittently and the measurement routine described above is performed repeatedly. This causes spectral data corresponding to the respective conveying direction imaging ranges W to be successively stored in time series into the image data storage device 74 along with position information in the film conveying direction (X direction) and in the film width direction (Y direction). This series of operations generate a two-dimensional spectral image Q having spectral data with regard to each pixel (as shown in FIG. 13).

The following describes the spectral image Q according to one or more embodiments. As shown in FIG. 13, the spectral image Q is image data including a plurality of pixels Qa arrayed in a two-dimensional arrangement. The respective pixels Qa include spectral data (data indicating spectral intensities (luminance values) of n wavelength components (for example, n=100 bands)).

When obtaining the spectral image Q in a predetermined inspection range (as shown by a two-dot chain line portion in FIG. 13) corresponding to one PTP sheet 1 as an object to be inspected, the control processing device 55 performs an inspection routine.

Figure 11:
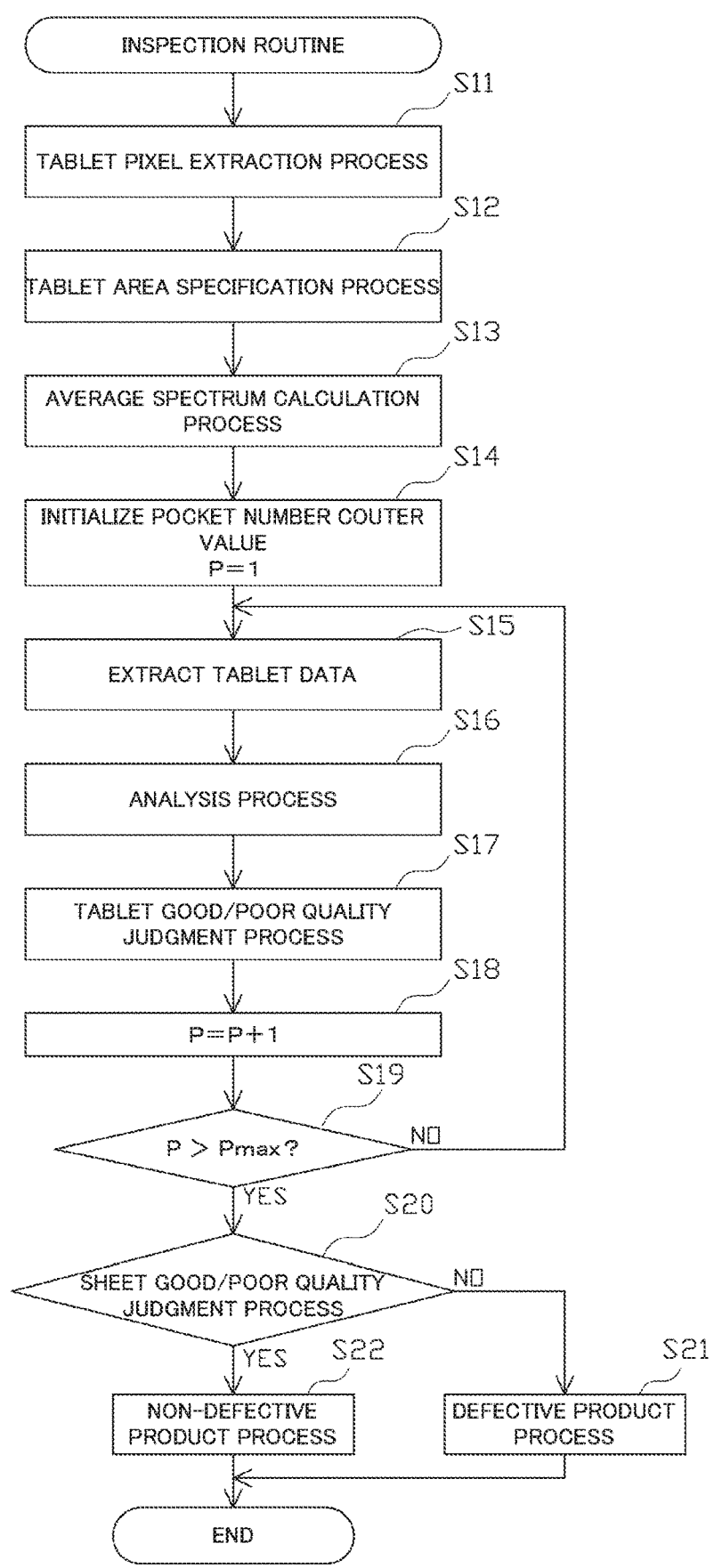
FIG. 11 is a flowchart showing an inspection routine.

The following describes the inspection routine with reference to the flowchart of FIG. 11. This routine is performed repeatedly every time the spectral image Q in the inspection range described above is obtained.

The control processing device 55 first performs a tablet pixel extraction process at step S11. In this process, the control processing device 55 extracts pixels Qb corresponding to the tablet 5 as an object to be analyzed (hereinafter referred to as "tablet pixels" Qb), among the respective pixels Qa of the spectral image Q.

According to one or more embodiments, for example, the control processing device 55 determines whether the spectral intensities (luminance values) at a predetermined wavelength in the spectral data of the respective pixels Qa are equal to or greater than a predetermined reference value and processes the spectral image Q by a binarization process. The control processing device 55 then extracts the tablet pixels Qb, based on the obtained binarized image data (as shown in FIG. 12 and FIG. 13).

According to one or more embodiments, as shown in FIG. 12, pixels Qa including data of imaging only the range of the tablet 5 via the through holes 54a of the light shield plate 54 without being affected by a peripheral location such as the light shield plate 54 and the container film 3 (pixels Qa that do not include data of imaging the peripheral location such as the light shield plate 54 and the container film 3) are extracted as tablet pixels Qb. FIG. 12 is an explanatory diagram illustrating a relationship between the conveying direction imaging range W and the spectral image Q. Pixels extracted as the tablet pixels Qb are given as hatched areas in FIGS. 12 and 13.

The extraction procedure of the tablet pixels Qb is, however, not limited to this method, but another method may be employed. For example, another employable method may calculate an integrated value of spectral data (spectral intensities of the respective wavelength components) with regard to each of the pixels Qa and determine whether the calculated integrated value is equal to or greater than a predetermined reference value, so as to extract the tablet pixels Qb.

The control processing device 55 subsequently performs a tablet area specification process at step S12. In this process, the control processing device 55 specifies areas of the ten tablets 5 placed in the respective pocket portions 2 in the inspection range.

According to one or more embodiments, for example, the control processing device 55 performs a labeling process with regard to the tablet pixels Qb obtained at step S11 described above and regards all adjacent tablet pixels Qb as linkage components of the tablet pixels Qb belonging to one identical tablet 5.

This process specifies one range of linkage components as a tablet area with regard to one tablet 5 placed in a predetermined pocket portion 2 (as shown in FIG. 12 and FIG. 13). In FIG. 12 and FIG. 13, linkage components (tablet area) of a plurality of tablet pixels Qb belonging to each tablet 5 are encircled by a thick frame.

The area specification procedure of the tablet 5 is, however, not limited to this method, but another method may be employed. For example, another employable method may determine pixels included in a predetermined range about a specific pixel at center, as pixels belonging to one identical tablet 5 with the specific pixel.

The control processing device 55 subsequently performs an average spectrum calculation process at step S13. In this process, with regard to each of the tablet areas of the respective tablets 5 specified at step S12 described above, the control processing device 55 calculates average spectral data of the tablet 5 by using spectral data of a plurality of tablet pixels Qb included in the tablet area.

According to one or more embodiments, the control processing device 55 averages all spectral data of a plurality of tablet pixels Qb belonging to the tablet area of one tablet 5 and calculates the averaged spectral data as average spectral data with regard to the tablet 5. This configuration is, however, not essential. A modification may be configured to extract part of a plurality of tablet pixels Qb belonging to the tablet area of one tablet 5 and calculate average spectral data with regard to the tablet 5 by using spectral data of the extracted tablet pixels Qb.

After calculating the average spectral data (hereinafter referred to as "spectrum measurement data") with regard to the respective ten tablets 5 placed in the respective pocket portions 2 in the inspection range, the control processing device 55 collectively stores these spectrum measurement data as measurement data with regard to one inspection range into the calculation result storage device 75.

At subsequent step S14, the control processing device 55 sets a counter value P of a pocket number counter provided in the calculation result storage device 75 to an initial value "1".

The "pocket number" denotes a serial number set corresponding to each of the ten pocket portions 2 included in one inspection range. The position of each pocket portion 2 is specified by the counter value P of the pocket number counter (hereinafter simply referred to as "pocket number counter value P") (as shown in FIG. 13).

In the illustrated example of FIG. 13, for example, an uppermost pocket portion 2 in a left column is set as the pocket portion 2 corresponding to a pocket number counter value [1]. A lowermost pocket portion 2 in a right column is set as the pocket portion 2 corresponding to a pocket number counter value [10].

The control processing device 55 subsequently performs a tablet data extraction process at step S15. In this process, the control processing device 55 extracts spectrum measurement data of a tablet 5 placed in a pocket portion 2 corresponding to a current pocket number counter value P (for example, P=1), from the measurement data with regard to one inspection range (spectrum measurement data of the ten tablets 5) obtained at step S13 described above.

The control processing device 55 subsequently performs an analysis process of the spectrum measurement data of the tablet 5 extracted at step S15 (step S16). This process corresponds to the analysis process according to one or more embodiments. The processing function of the control processing device 55 that performs this process configures the inspection module (analysis module) according to one or more embodiments.

According to one or more embodiments, for example, the control processing device 55 uses a loading vector obtained in advance and performs principal component analysis (PCA) with regard to the spectrum measurement data of the tablet 5 obtained at step S13 described above. More specifically, the control processing device 55 calculates a principal component point by arithmetic operation of the loading vector and the spectrum measurement data of the tablet 5.

The control processing device 55 subsequently performs a tablet good/poor quality judgment process at step S17. In this process, the control processing device 55 determines whether the tablet 5 placed in the pocket portion 2 corresponding to the current pocket number counter value P (for example, P=1) is a non-defective product (identical type of object) or a defective product (different type of object), based on the result of analysis obtained by the analysis process at step S16 described above.

More specifically, the control processing device 55 plots the principal component point calculated at step S16 described above in a PCA chart and determines the tablet 5 as a non-defective product (identical type of object) when the plotted data is within a non-defective range set in advance, while determining the tablet 5 as a defective product (different type of object) when the plotted data is out of the non-defective range.

The control processing device 55 then stores the result of determination with regard to the tablet 5 ("non-defective" or "defective") into the calculation result storage device 75.

The control processing device 55 subsequently adds "1" to the current pocket number counter value P at step S18 and proceeds to step S19 to determine whether the newly set pocket number counter value P exceeds a maximum value Pmax. The maximum value Pmax denotes a maximum value of the number of pocket portions 2 included in one inspection range ("10" according to one or more embodiments).

In the case of negative determination, the control processing device 55 goes back to step S15 to perform the series of processing described above again. In the case of affirmative determination, on the other hand, the control processing device 55 determines that the good/poor quality judgment of the tablets 5 has been completed with respect to all the pocket portions 2 and proceeds to step S20.

At subsequent step S20, the control processing device 55 performs a sheet good/poor quality judgment process. In this process, the control processing device 55 determines whether the PTP sheet 1 corresponding to the inspection range is a non-defective product or a defective product, based on the results of determination in the tablet good/poor quality judgment process at step S17 described above.

More specifically, when there is any tablet 5 determined as "defective" in the inspection range, the control processing device 55 determines the PTP sheet 1 corresponding to the inspection range as a "defective product" and proceeds to step S21.

When there is no tablet 5 determined as "defective" in the inspection range, on the other hand, the control processing device 55 determines the PTP sheet 1 corresponding to the inspection range as a "non-defective product" and proceeds to step S22.

The control processing device 55 performs a defective product process at step S21 to store the result of determination as the "defective product" with regard to the PTP sheet 1 in the calculation result storage device 75, outputs this determination result to the defective sheet discharge mechanism or the like of the PTP packaging machine 10, and then terminates the inspection routine.

The control processing device 55, on the other hand, performs a non-defective product process at step S22 to store the result of determination as the "non-defective product" with regard to the PTP sheet 1 (inspection range) in the calculation result storage device, and then terminates the inspection routine.

As described above in detail, the configuration of one or more embodiments that performs different type inclusion inspection by taking advantage of spectral analysis, is equipped with the light shield plate 54 that blocks the near infrared light emitted from the illumination device 52 from entering the container film 3, and obtains spectral data with regard to the tablets 5 via the through holes 54a provided in the light shield plate 54.

This configuration suppresses or prevents the near infrared light from unnecessarily entering the container film 3 and also reduces the ambient light which is transmitted through the container film 3 and which the tablet 5 is irradiated with, thus enabling the more accurate spectral data to be obtained with regard to the tablet 5.

As a result, this configuration allows for stable spectral analysis with regard to the tablet 5 even in the state that the tablet 5 is placed in the pocket portion 2 of the container film 3, and thereby suppresses reduction of the inspection accuracy.

Furthermore, in the configuration of one or more embodiments, the diameter R1 of the through hole 54a of the light shield plate 54 is set to be smaller than the diameter R2 of the tablet 5. This configuration suppresses the near infrared light from unnecessarily entering not only the general part of the container film 3 but the pocket portion 2. This results in further enhancing the functions and the advantageous effects described above.

The present invention is not limited to the description of the above embodiments but may be implemented, for example, by configurations described below. The embodiments described above may also be naturally implemented by applications and modifications other than those illustrated below.

(a) The embodiments described above illustrate the case where the content is the tablet 5. The type or the like of the content is, however, not specifically limited. The content may be, for example, a capsule, a supplement, or a food item. The tablet includes a solid preparation such as an uncoated tablet and a sugar-coated tablet.

Moreover, the shape or the like of the tablet is not limited to the description of the above embodiments. The above embodiments illustrate the lens-shaped tablet that is formed in the circular shape in plan view and that has the different thicknesses in the central part and in the peripheral part, as the tablet 5. This configuration is, however, not essential. The tablet 5 may be, for example, a tablet having a substantially elliptical shape, a substantially oval shape, a substantially polygonal shape in plan view or the like or may be a flat tablet in a disk shape or the like.

(b) The materials of the container film 3 and the cover film 4 are not limited to those of the embodiments described above, but other materials may be employed. For example, the container film 3 may be made from a metal material that contains aluminum as a main material, for example, aluminum laminated film.

Even when the container film 3 is made of a light shield material (opaque material) like this example, light reflected from an inner surface of the pocket portion 2 is likely to become ambient light and affect the inspection. The light shield plate 54 of the embodiments described above is thus also effective in this case.

(c) The arrangement and the number of the pocket portions 2 in the PTP sheet 1 are not limited at all to those described in the above embodiments. A PTP sheet may be configured to have any of various other arrangements of and any number of pocket portions, for example, a total of twelve pocket portions arrayed in three lines.

(d) The above embodiments are configured to irradiate the tablets 5 and take the images of the tablets 5 from the opening side of the pocket portions 2 and perform the different type inclusion inspection by the inspection device 22 in a post process after the pocket portions 2 are filled with the tablets 5 and a previous process before the cover film 4 is mounted to the container film 3.

Figure 14:
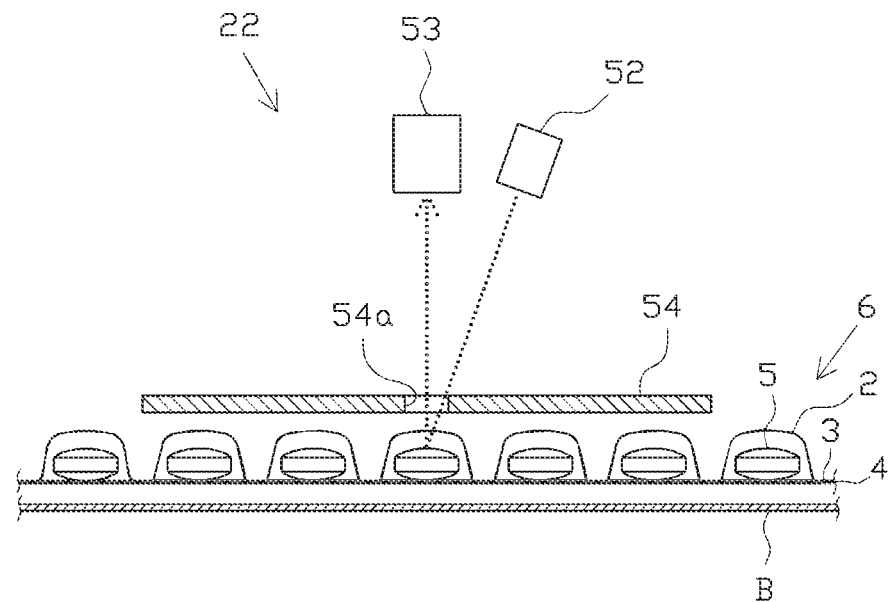
FIG. 14 is a partial sectional view schematically illustrating the arrangement configuration of an inspection device according to one or more embodiments.

This configuration is, however, not essential. For example, a modification may be configured to irradiate the tablets 5 and take images of the tablets 5 across the pocket portions 2 from the container film 3-side of the PTP film 6 and perform the different type inclusion inspection by the inspection device 22 as shown in FIG. 14 in a post process after the cover film 4 is mounted to the container film 3 and a previous process before the PTP sheet 1 is punched out from the PTP film 6.

This modified configuration enables the inspection to be performed in a state that the tablets 5 are not exchanged and thereby enhances the inspection accuracy.

In the case where the inspection is performed in a previous process before the cover film 4 is mounted to the container film 3 by the inspection device 22 of the conventional configuration without the light shield plate 54, light emitted from the illumination device 52 passes through the container from 3 made of a transparent material and is subsequently reflected from a background portion, for example, a conveyance lane B (as shown in FIG. 7), located on a side opposite to the container film 3 to enter the container film 3 again. Accordingly, the reflected light that is reflected from the background portion passes through the container film 3 and becomes ambient light to radiate the tablet 5. This is likely to affect the inspection (the same applies to the configuration described below in (e)). The configuration of providing the light shield plate 54 as described above, however, suppresses the occurrence of such an issue (as shown in FIG. 7).

In the case where the inspection is performed in a post process after the cover film 4 is mounted to the container film 3 by the inspection device 22 of the conventional configuration without the light shield plate 54, on the other hand, the reflected light that is reflected from the cover film 4 located on a background of the container film 3 passes through the container film 3 and becomes ambient light to radiate the tablet 5. This is likely to affect the inspection. The configuration of providing the light shield plate 54 as described above, however, suppresses the occurrence of such an issue (as shown in FIG. 14).

(e) When the container film 3 is made of a transparent material, a modification may be configured to irradiate the tablets 5 and take images of the tablets 5 across the pocket portions 2 of the container film 3 and perform the different type inclusion inspection in a post process after the pocket portions 2 are filled with the tablets 5 and a previous process before the cover film 4 is mounted to the container film 3.

The configuration of performing the inspection from the opening side of the pocket portions 2, however, enables the tablets 5 to be irradiated and imaged not across the pocket portions 2 (the container film 3) but directly without any interruption and thus enhances the inspection accuracy.

(f) Another modification may be configured to irradiate the tablets 5 and take images of the tablets 5 across the pocket portions 2 from the container film 3-side of the PTP sheet 1 conveyed by the conveyor 39 and perform the different type inclusion inspection in a post process after the PTP sheet 1 is punched out from the PTP film 6.

In this case, in place of the configuration that the inspection device 22 is provided inside of the PTP packaging machine 10 (inline configuration), the inspection device 22 may be provided as a device separate from the PTP packaging machine 10 to perform offline inspection of the PTP sheet 1. In this modification, the inspection device 22 may be equipped with a conveyance unit configured to convey the PTP sheet 1.

A modification may be configured to perform the offline inspection in such a state that the PTP sheet 1 is not continuously conveyed but is at stop (in a state that the pocket portions 2 of the PTP sheet 1 are aligned with the through holes 54*a* of the light shield plate 54). From the viewpoint of enhancing the productivity, however, the inline inspection may be performed, while the PTP sheet 1, the PTP film 6 or the container film 3 is conveyed continuously.

In the manufacturing field of the PTP sheet 1 or the like, there is a recent demand for increasing the speed of various inspections such as different type inclusion inspection, accompanied with an increase in the production rate. For example, an inspection performed on the PTP packaging machine 10 may be required to inspect 100 or more tablets 5 per second.

(g) The embodiments described above are configured to analyze the spectral data by principal component analysis (PCA). This technique is, however, not essential. Another known technique, such as PLS regression analysis may be employed to analyze the spectral data.

(h) The configurations of the illumination device 52 and the imaging device 53 are not limited to those described in the above embodiments. For example, a reflection type diffraction grating, a prism or the like may be employed as the spectral unit, in place of the two-dimensional spectroscope 62.

(i) A background portion, for example, located on a side opposite to the illumination device 52 across the container film 3 may be configured to look black or dark in color to a ray in a wavelength range of near infrared light emitted from the illumination device 52, although not being specifically referred to in the above embodiments. This configuration prevents the light reflected by the background portion from becoming ambient light.

More specifically, for example, the conveyance lane B provided to convey the container film 3 corresponds to the "background portion" in a configuration that the inspection device 22 is placed in a previous process before the cover film 4 is mounted like the above embodiments. In another example, the cover film 4 itself corresponds to the "background portion" in a configuration that the inspection device 22 is placed in a post process after the cover film 4 is mounted and performs an inspection with irradiating the tablets 5 with near infrared light across the pocket portions 2 of the container film 3 (as shown in FIG. 14).

The state that the "background portion" "looks black or dark in color to the ray in the wavelength range of near infrared light" includes, for example, such a state that the "background portion" is colored with a coloring agent (a pigment or a dye) of black or a dark color that does not reflect or is unlikely to reflect the near infrared light, for example, carbon black or another black pigment or such a state that the "background portion" is made of such a colored material.

More specifically, the cover film 4 may be configured to have its surface covered with a coat layer of black or a dark color that does not reflect or is unlikely to reflect the near infrared light.

(j) In addition to the above description of (i), the light shield plate 54 may be configured such that its surface opposed to the imaging device 53 looks a lighter color than the black color or the dark color of the background portion to a ray of at least one specific wavelength component included in the wavelength range of near infrared light emitted from the illumination device 52.

This configuration can thus check the levels (light-dark levels) of luminance data of respective pixels belonging to a pixel array with regard to the specific wavelength component out of spectroscopic image data obtained by the imaging device 53 and thereby recognize the positions of the through holes 54*a* of the light shield plate 54 relative to the imaging device 53 (imaging range).

In other words, this configuration enables the positional relationship of the imaging device 53 (the imaging range) relative to the light shield plate 54 (the through holes 54*a*) to be recognized, based on the spectroscopic image data. This configuration accordingly allows for position adjustment of the imaging device 53 (the imaging range) and the light shield plate 54 (the through holes 54*a*) as described below in (l).

(k) The light shield plate 54 may be configured such that at least its surface on a side opposed to the container film 3 looks black or dark in color to the ray in the wavelength range of near infrared light emitted from the illumination device 52. This configuration prevents the light reflected by the light shield plate 54 from becoming ambient light.

The state that "at least the surface of the light shield plate 54 on the side opposed to the container film 3 looks black or dark in color to the ray in the wavelength range of near infrared light" includes, for example, such a state that "at least the surface of the light shield plate 54 on the side opposed to the container film 3" is colored with a coloring agent (a pigment or a dye) of black or a dark color that does not reflect or is unlikely to reflect the near infrared light, for example, carbon black or another black pigment or such a state that "at least the surface of the light shield plate 54 on the side opposed to the container film 3" is made of such a colored material.

Figure 15:
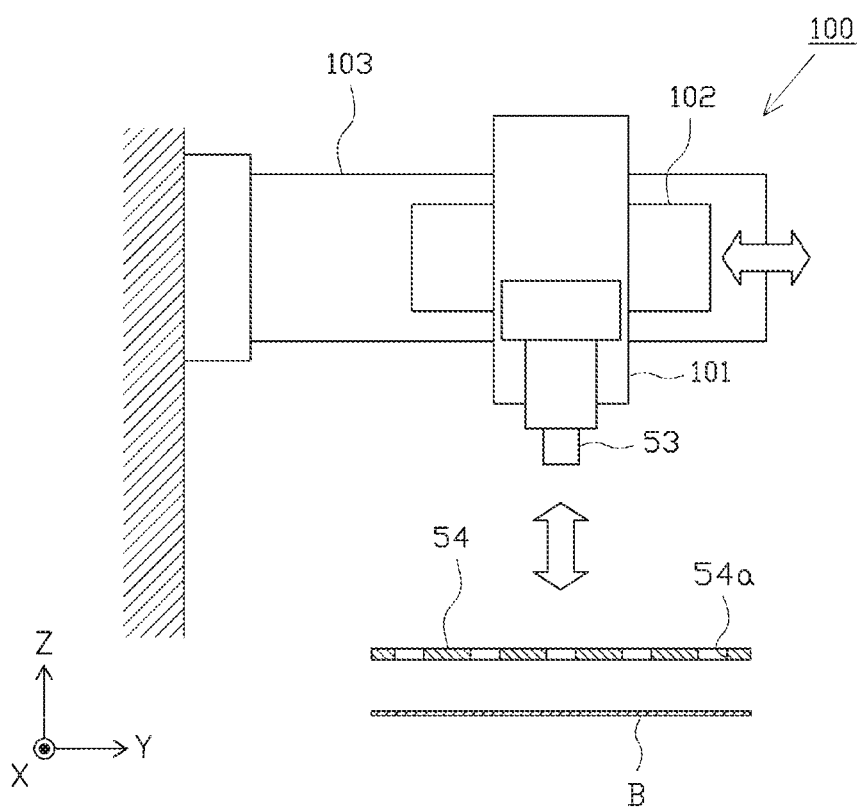
FIG. 15 is a schematic configuration diagram illustrating an imaging position adjustment mechanism.

(l) The inspection device 22 may be equipped with an imaging position adjustment module configured to adjust an imaging position of the imaging device 53, for example, like an imaging position adjustment mechanism 100 shown in FIG. 15, although not being specifically referred to in the above embodiments.

The imaging position adjustment mechanism 100 shown in FIG. 15 includes a Z axis moving mechanism 101 configured to slidably move the imaging device 53 along a vertical direction (Z direction) that is a normal direction of the conveyance lane B, a Y axis moving mechanism 102 configured to slidably move the imaging device 53 along a lane width direction of the conveyance lane B (Y direction), and an X axis moving mechanism 103 configured to slidably move the imaging device 53 along a conveyance path direction of the conveyance lane B (X direction).

The following describes an imaging position adjustment process performed under the above configuration prior to a start of manufacturing the PTP sheet 1. The imaging position adjustment process is performed, for example, in a state that the container film 3 is not set in the PTP packaging machine 10 (as shown in FIGS. 15 to 17). This is, however, not essential. According to a modification, the imaging position adjustment process may be performed in a state that the container film 3 is set in the PTP packaging machine 10 but the tablets 5 are not filled in the pocket portions 2.

Figure 16A:
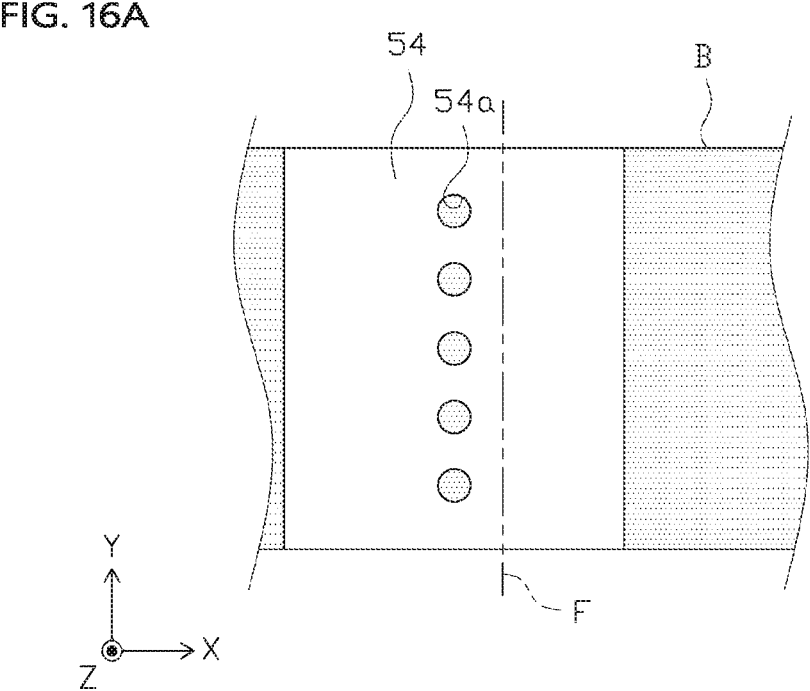
FIGS. 16A-16B are diagrams each illustrating an imaging position adjustment process.
Figure 17A:
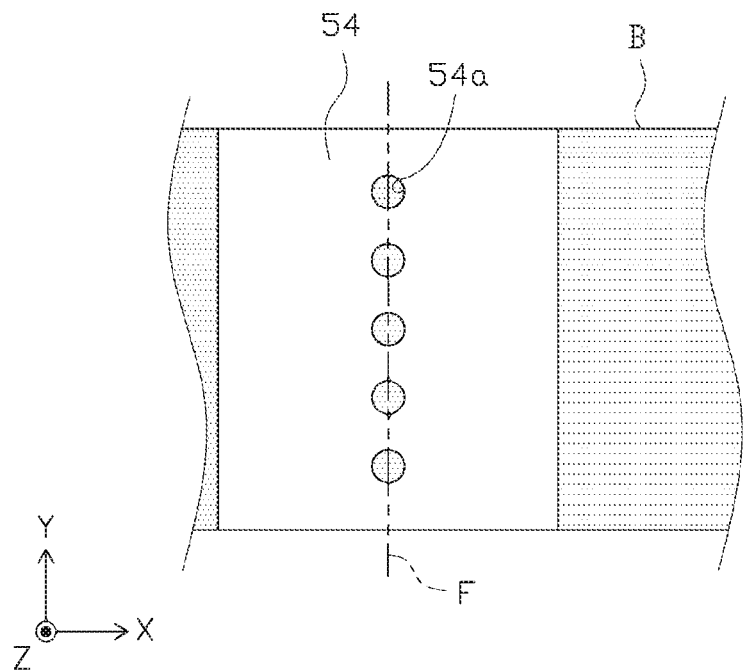
FIGS. 17A-17B are diagrams each illustrating the imaging position adjustment process.

Two-dot chain lines in FIG. 16A and in FIG. 17A indicate an imaging position F of the imaging device 53 (the position of an optical axis of the optical lens assembly 61 that is the center position of the field of vision) in the conveyance path direction of the conveyance lane B (X direction).

In the imaging position adjustment process, the operator first operates the input device 72 and the like to irradiate the light shield plate 54 with near infrared light and performs an imaging position recognizing process to obtain spectroscopic image data by the imaging device 53.

Figure 16B:
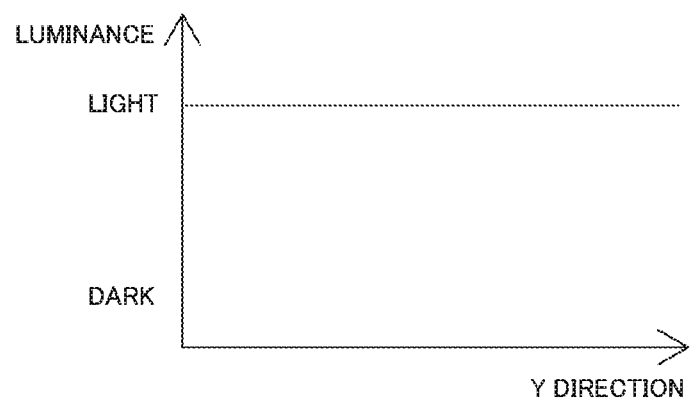
Figure 17B:
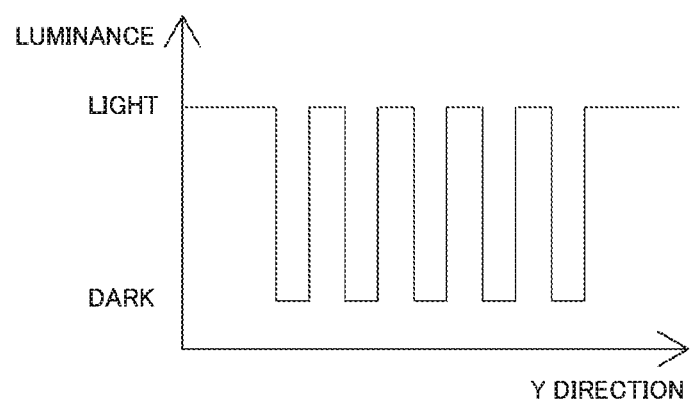

This configuration provides luminance data displayed on a display screen (not shown) of the display device 73 as shown in FIG. 16B and FIG. 17B.

This luminance data display is provided as one line expression of luminance data of respective pixels belonging to a pixel array with regard to a specific wavelength component described below, out of the spectroscopic image data obtained by the imaging position recognizing process described above, in order to enable the operator to recognize a relationship between the positions of the respective pixels (positions in the lane width direction) and the luminance levels at the respective positions.

The operator subsequently performs position adjustment of the imaging position F of the imaging device 53 and the through holes 54a of the light shield plate 54 with visually checking the levels (light-dark levels) of the luminance data displayed on the display screen of the display device 73.

According to the embodiments, the conveyance lane B as the background portion located on the side opposite to the illumination device 52 across the light shield plate 54 looks black or dark in color to the ray in the wavelength range of near infrared light emitted from the illumination device 52.

The upper surface of the light shield plate 54 on the side opposed to the imaging device 53, on the other hand, looks the lighter color than the black or the dark color of the conveyance lane B to a ray of at least one specific wavelength component included in the wavelength range of near infrared light emitted from the illumination device 52.

In other words, at least one specific wavelength component that makes the upper surface of the light shield plate 54 look the lighter color than the black or the dark color of the conveyance lane B is set in the wavelength range of near infrared light.

For example, when the imaging position recognizing process described above is performed in the state that the imaging position F of the imaging device 53 does not overlap the through holes 54a of the light shield plate 54 as shown in FIG. 16A, luminance data displayed on the display screen of the display device 73 has a fixed luminance level over the entire lane width direction (Y direction) as shown in FIG. 16B.

In another example, when the imaging position recognizing process described above is performed in the state that the imaging position F of the imaging device 53 overlaps the through holes 54a of the light shield plate 54 as shown in FIG. 17A, luminance data displayed on the display screen of the display device 73 includes "lighter portions" having a high luminance level corresponding to the positions of the general portion of the light shield plate 54 (locations where the through holes 54 are not formed, i.e. light shielding portions) and "darker portions" having a low luminance level corresponding to the positions of the through holes 54a (positions where the conveyance lane B as the background portion can be seen through) as shown in FIG. 17B.

Accordingly, this configuration enables the operator to check the width of the "darker portions" described above in the lane width direction (Y direction), based on the spectroscopic image data obtained in the imaging position recognizing process and to thereby recognize the positional relationship of the imaging position F of the imaging device 53 relative to the positions of the through holes 54a of the light shield plate 54.

For example, when the width of the "darker portions" described above in the lane width direction (Y direction) is equal to a predetermined maximum value (the diameter of the through holes 54a), this means that the imaging position F of the imaging device 53 in the conveyance path direction of the conveyance lane B (X direction) is located at the centers of the through holes 54a.

By taking advantage of the foregoing, the operator operates the input device 72 and the like to activate the respective moving mechanisms 101 to 103 described above (mainly the X-axis moving mechanism 103) with viewing the luminance data (light-dark level data) displayed on the display screen of the display device 73 and performs the imaging position adjustment process to adjust the imaging position F of the imaging device 53.

For example, when the imaging position F of the imaging device 53 is the location shown in FIG. 16A, the position adjustment operation shifts the imaging position F of the imaging device 53 to the location shown in FIG. 17A.

After the position adjustment of the imaging device 53 is completed as described above, the imaging position adjustment process is terminated with settling the position of the imaging device 53.

(m) According to the configuration of the embodiments described above in (l), the operator operates the input device 72 and the like and performs position adjustment of the imaging device 53 with viewing the luminance data displayed on the display screen of the display device 73. This configuration is, however, not essential. According to a modification, the inspection device 22 may be configured to automatically perform the imaging position recognizing process and the imaging position adjustment process described above without displaying the luminance data on the display screen of the display device 73.

(n) The configuration of the light shield plate, for example, the shape and the dimensions of the light shield plate, is not limited to the configuration of the embodiments described above.

For example, the light shield plate 54 according to one or more embodiments has such dimensions as to cover the entire irradiation area K (excluding the through holes 54a) of near infrared light which the container film 3 is irradiated with. More specifically, the light shield plate 54 is formed to have a width identical with the width of the container film 3 such as to cover the entire range in the film width direction of the container film 3 (Y direction) and to have a length in the film conveying direction (X direction) such as to cover the range where the five pocket portions 2 are formed.

This configuration is, however, not essential. For example, when the irradiation area K of near infrared light is relatively large and has its outer edge significantly away from the imaging position F of the imaging device 53 to such an extent that does not affect the inspection, a modification may be configured not to shield the light in part of the irradiation area K of near infrared light. Of course the configuration of shielding the light in the entire irradiation area K of near infrared light may be adopted.

In another example, when the irradiation area K of near infrared light is set in an extremely narrow range, an employable light shield member may be configured to shield the light in only a range where one pocket portion 2 is formed and its periphery with regard to the film conveying direction (X direction).

(o) The configuration of the through holes, for example, the dimensions and the shape of the through holes that allow the near infrared light to pass through is not limited to the configuration of the embodiments described above.

The through hole 54a according to one or more embodiments is formed in a circular shape in plan view and has the diameter R1 set to be smaller than the diameter R2 of the tablet 5. Accordingly, the dimensions of the through hole 54a in both the film conveying direction (X direction) and the film width direction (Y direction) are set to be smaller than the dimensions of the tablet 5 in these directions.

This configuration is, however, not essential. For example, according to a modification, a through hole formed in a circular shape in plan view may be configured to have dimensions in the film conveying direction (X direction) and the film width direction (Y direction) smaller than the dimensions of the pocket portion 2 in these directions.

Furthermore, the through holes 54a are not necessarily formed in the circular shape in plan view. For example, according to a modification, through holes may be formed in an oval shape in plan view to have a dimension in one direction out of the film conveying direction (X direction) and the film width direction (Y direction) smaller than the dimension of the tablet 5 or the pocket portion 2 in this one direction and to have a dimension in the other direction larger than the dimension of the tablet 5 or the pocket portion 2 in the other direction.

(p) The light shield plate 54 according to one or more embodiments has the five through holes 54a that are formed along the film width direction respectively corresponding to the five pocket portions 2 arrayed at the predetermined intervals in the film width direction of the container film 3.

Figure 18:
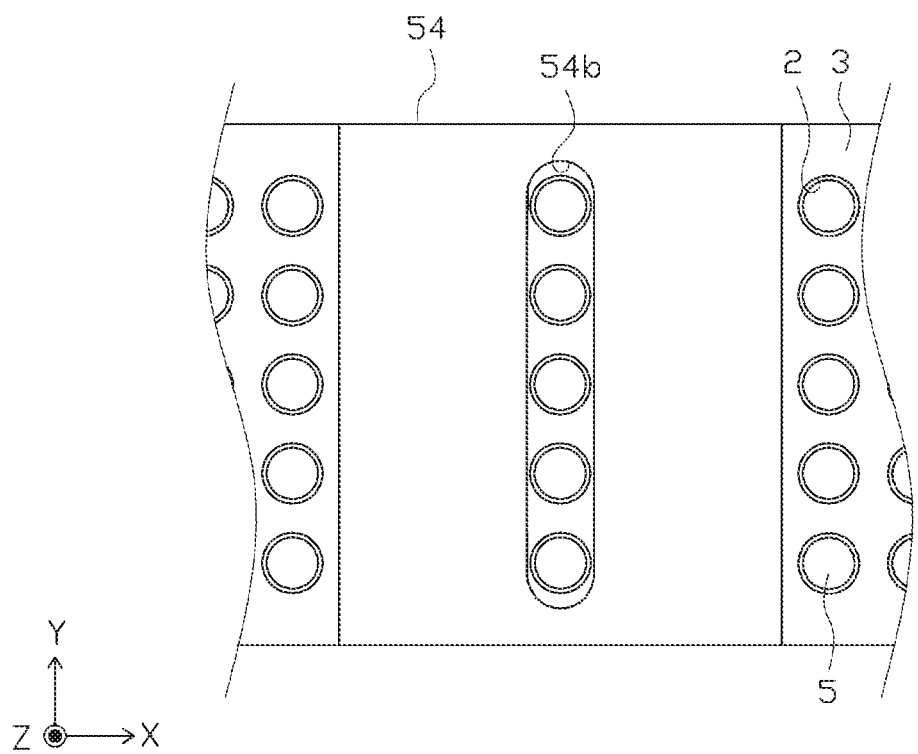
FIG. 18 is a plan view illustrating the configuration of a light shield plate according to one or more embodiments.
Figure 19A:
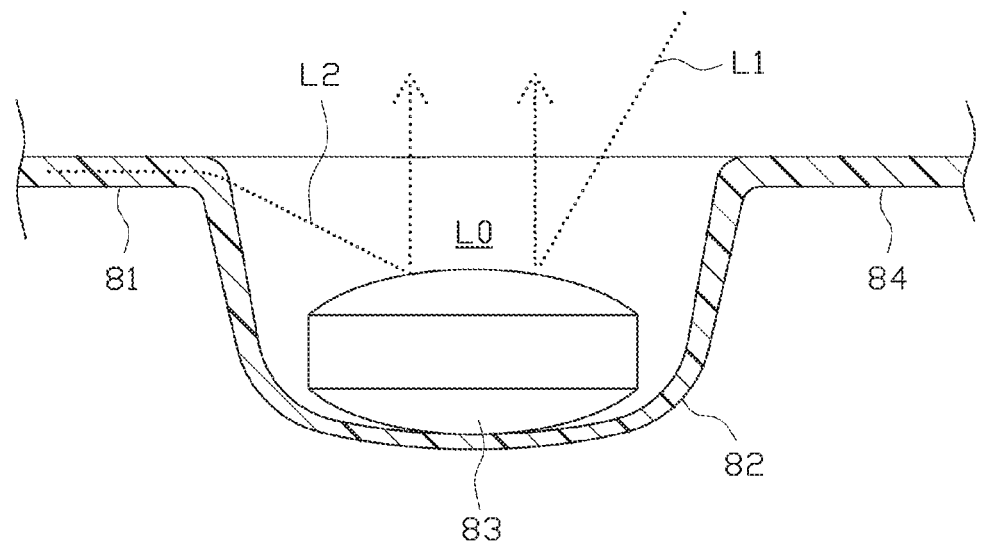
FIG. 19A is a schematic diagram illustrating irradiation light, which a tablet is irradiated with from an opening side of a pocket portion not across a container film.
Figure 19B:
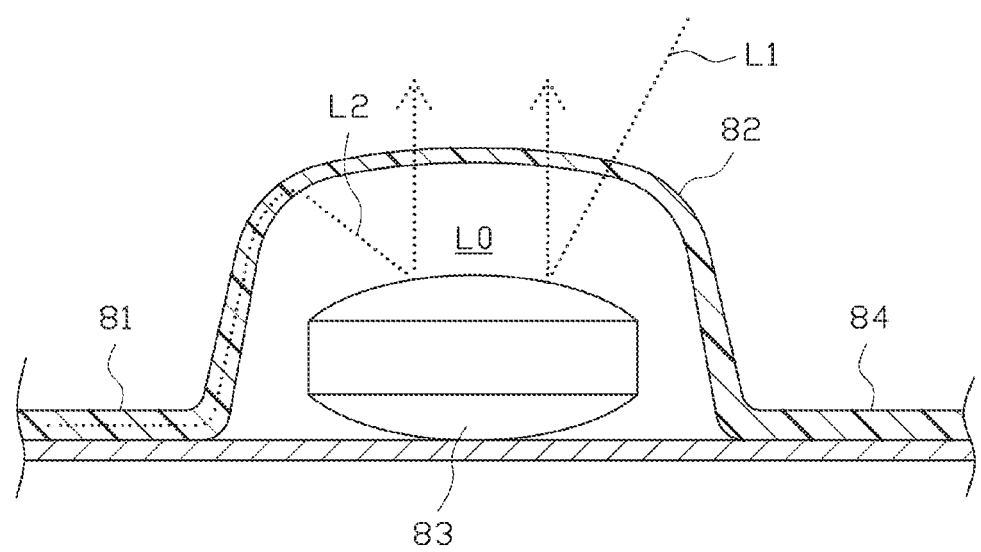
FIG. 19B is a schematic diagram illustrating irradiation light, which the tablet is irradiated with across the container film (pocket portion)
Figure 20A:
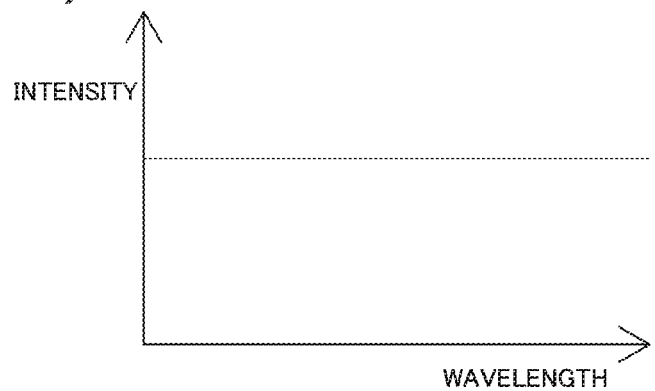
Figure 20B:
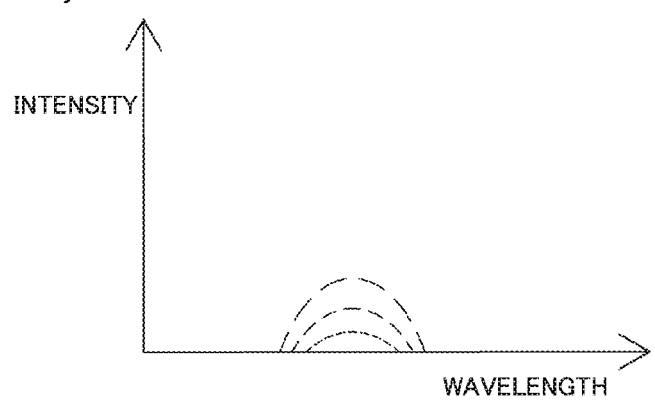
FIG. 20B is a chart illustrating a wavelength characteristic of ambient light, which the tablet placed in the pocket portion is irradiated with, and FIG. 20C is a chart illustrating a wavelength characteristic of irradiation light configured by combining the primary irradiation light with the ambient light.
Figure 20C:
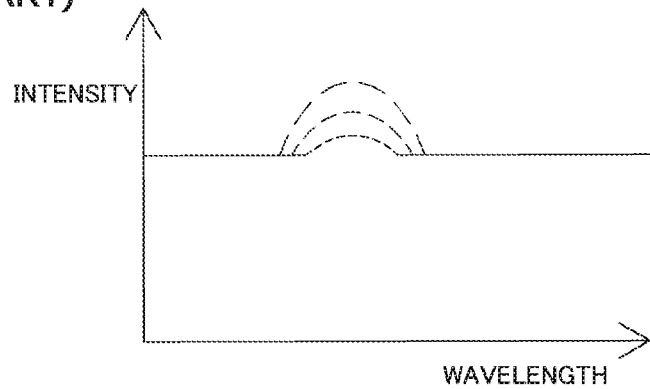

This configuration is, however, not essential. According to a modification, the light shield plate may be configured to have one through hole corresponding to a plurality of the pocket portions 2. For example, as shown in FIG. 18, the light shield plate may be configured to have one through hole 54b that is extended in the film width direction corresponding to the five pocket portions 2 arrayed at predetermined intervals in the film width direction of the container film 3.

In this modification, the through hole 54b is set to have the dimension in the film conveying direction (X direction) larger than the dimension of the pocket portion 2 in this direction. This configuration is, however, not essential. According to another modification, the through hole 54 may be configured to have the dimension in the film conveying direction (X direction) smaller than the dimension of the tablet 5 or the pocket portion 2 in this direction.

(q) The above embodiments are configured to take an image of the optical spectrum at a plurality of positions with regard to one tablet 5. This configuration is, however, not essential. A modification may be configured to take an image of the optical spectrum only at one position with regard to one tablet 5. In this modification, an image of the optical spectrum of the tablet 5 may be taken at a timing when the tablet 5 blocks the through hole 54a in plan view, i.e., at a timing with no effect or with less effect of ambient light.

In the configuration that the diameter R1 of the through hole 54a is set to be larger than the diameter R2 of the tablet 5, an image of the optical spectrum of the tablet 5 may be taken at a timing when the center of the pocket portion 2 or the center of the tablet 5 is located at the center position of the through hole 54a.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims

REFERENCE SIGNS LIST

1 . . . PTP sheet, 2 . . . pocket portion, 3 . . . container film, 4 . . . cover film, 5 . . . tablet, 10 . . . PTP packaging machine, 22 . . . inspection device, 52 . . . illumination device, 53 . . . imaging device, 54 . . . light shield plate, 54a . . . through hole, 55 . . . control processing device, 62 . . . two-dimensional spectroscope, 63 . . . camera, K . . . irradiation area of near infrared light, R1 . . . diameter of through hole, R2 . . . diameter of tablet 5

The invention claimed is:

1. An inspection device for manufacturing a Press Through Package (PTP) sheet that comprises a container film including pocket portions in which a content is placed and a cover film closing the pocket portions, the inspection device comprising:

an illumination device that emits near infrared light toward the container film holding the content;

a light shield that is disposed between the illumination device and the container film and prevents the near infrared light from entering the container film, wherein the light shield has through holes that allow the near infrared light to pass through;

a spectroscope that comprises a slit and disperses reflected light from the content irradiated with the near infrared light, wherein the reflected light reaches the spectroscope via the through holes and passes the slit to be limited within a predetermined imaging area before being dispersed;

a camera that images an optical spectrum of the reflected light dispersed by the spectroscope and obtains spectroscopic image data; and a controller that:
  obtains spectral data of the content based on the spectroscopic image data, and
  performs a predetermined inspection with regard to the content based on the spectral data of the content, wherein the through holes are disposed at positions respectively corresponding to the pocket portions, each of the through holes has a dimension smaller than a dimension of any of the pocket portions, the dimension of each of the through holes is along at least one of a wavelength dispersion direction of the optical spectrum and a direction perpendicular to the wavelength dispersion direction, and the dimension of each of the pocket portions is along at least one of the wavelength dispersion direction and the direction perpendicular to the wavelength dispersion direction.

2. The inspection device according to claim 1, wherein
the controller obtains the spectral data of the content based on the spectroscopic image data obtained by the camera in such a state that a center of each of the pocket portions or a center of the content is at a center of each of the through holes, the center of each of the pocket portions or the center of the content is at least one of a center in the wavelength dispersion direction of the optical spectrum and a center in the direction perpendicular to the wavelength dispersion direction, and the center of each of the through holes is at least one of a center in the wavelength dispersion direction and a center in the direction perpendicular to the wavelength dispersion direction.

3. The inspection device according to claim 1, wherein
each of the through holes has a dimension smaller than a dimension of the content, and the dimension of the content is along at least one of the wavelength dispersion direction and the direction perpendicular to the wavelength dispersion direction.

4. The inspection device according to claim 3, wherein the controller obtains the spectral data of the content based on the spectroscopic image data obtained by the camera in such a state that the content blocks the through holes in plan view viewed in a direction perpendicular to a flange portion of the container film.

5. The inspection device according to claim 1, further comprising:
a background portion on a side opposite to the illumination device across the container film and that has a black or dark color with respect to a ray within a wavelength range of the near infrared light.

6. The inspection device according to claim 5, wherein the light shield has a surface that faces the camera and has a lighter color than the black or dark color of the background portion with respect to a ray of at least one specific wavelength component within the wavelength range of the near infrared light.

7. The inspection device according to claim 6, further comprising:
a display device that displays luminance data of pixels of a pixel array corresponding to the specific wavelength component in the spectroscopic image data and shows a relationship between a position of each of the pixels and a luminance level at the position.

8. The inspection device according to claim 1, wherein the light shield has a surface that faces the container film and has a black or dark color with respect to a ray within a wavelength range of the near infrared light.

9. A Press Through Package (PTP) packaging machine, comprising
the inspection device according to claim 1.

* * * * *